(12) United States Patent
Lackey

(10) Patent No.: US 8,184,751 B2
(45) Date of Patent: May 22, 2012

(54) INTEGRATED INTERFERENCE CANCELLATION SYSTEM ARCHITECTURE WITH DISTORTION CORRECTION

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 775 days.

(21) Appl. No.: 12/315,430

(22) Filed: Dec. 3, 2008

(65) Prior Publication Data
US 2010/0135439 A1 Jun. 3, 2010

(51) Int. Cl.
*H04L 27/06* (2006.01)
(52) U.S. Cl. ........ 375/344; 375/354; 375/219; 375/296; 375/316; 375/130; 375/135; 375/136; 327/141; 327/142; 370/503; 370/504; 370/505

(58) Field of Classification Search .................. 375/344, 375/354, 219, 296, 316, 130, 135, 136; 327/141, 327/142; 370/503, 504, 505
See application file for complete search history.

(56) References Cited

U.S. PATENT DOCUMENTS
6,693,971 B1  2/2004 Kowalski
2005/0069063 A1*  3/2005 Waltho et al. ............. 375/346
* cited by examiner

*Primary Examiner* — David C. Payne
*Assistant Examiner* — Zewdu Kassa
(74) *Attorney, Agent, or Firm* — Dilworth & Barrese, LLP; Leo G. Lenna

(57) ABSTRACT

A system and associated method is provided for improved rejection of an interfering signal coupled from a transmission antenna into a local receive antenna in the presence of local multipath. A system of the invention includes a common feedback junction, (i.e., a single sampling point used by all parameter matching control loops), for adjusting a number of distortion matching circuits while advantageously maintaining independence of tuning and other independent circuit actions.

29 Claims, 21 Drawing Sheets

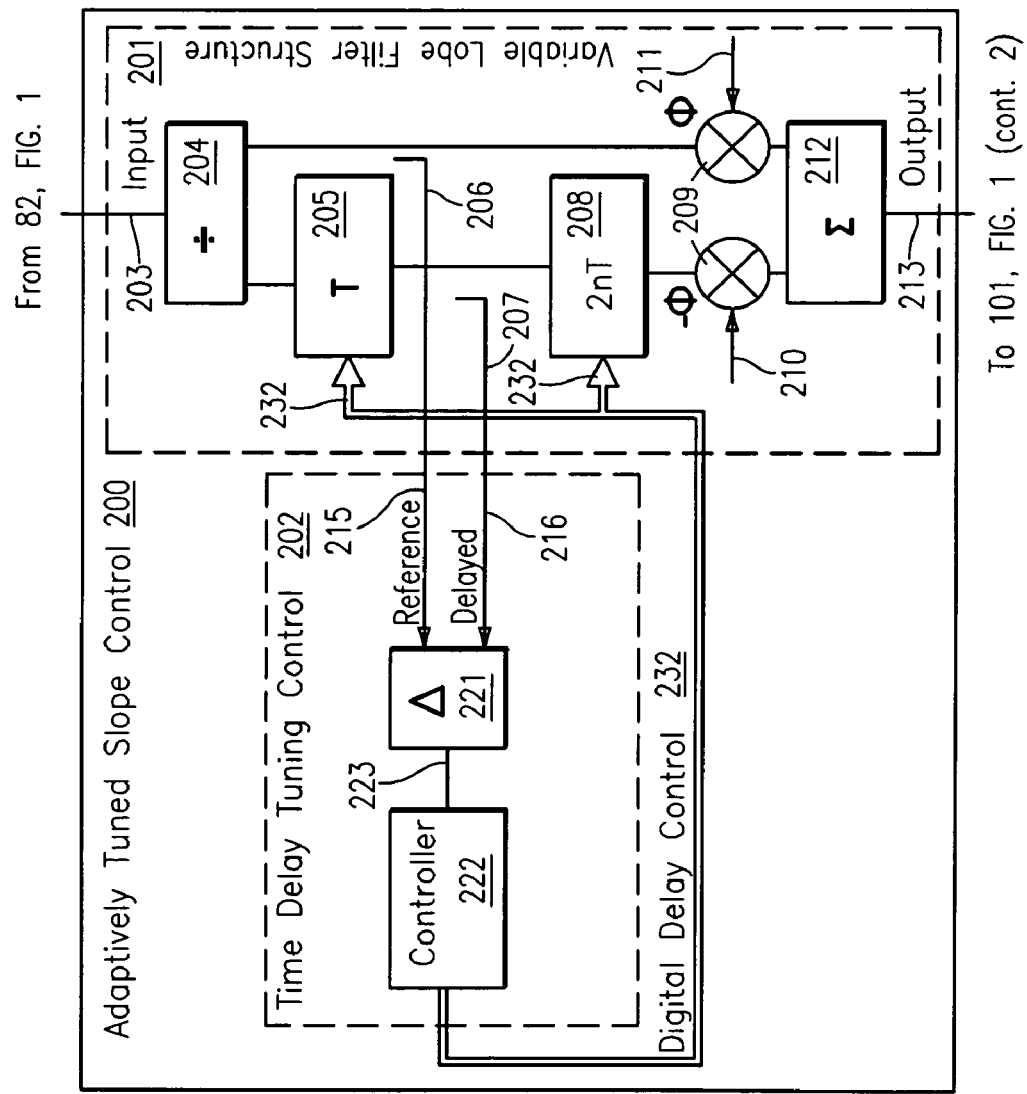
FIG. 1 (Cont. 1)

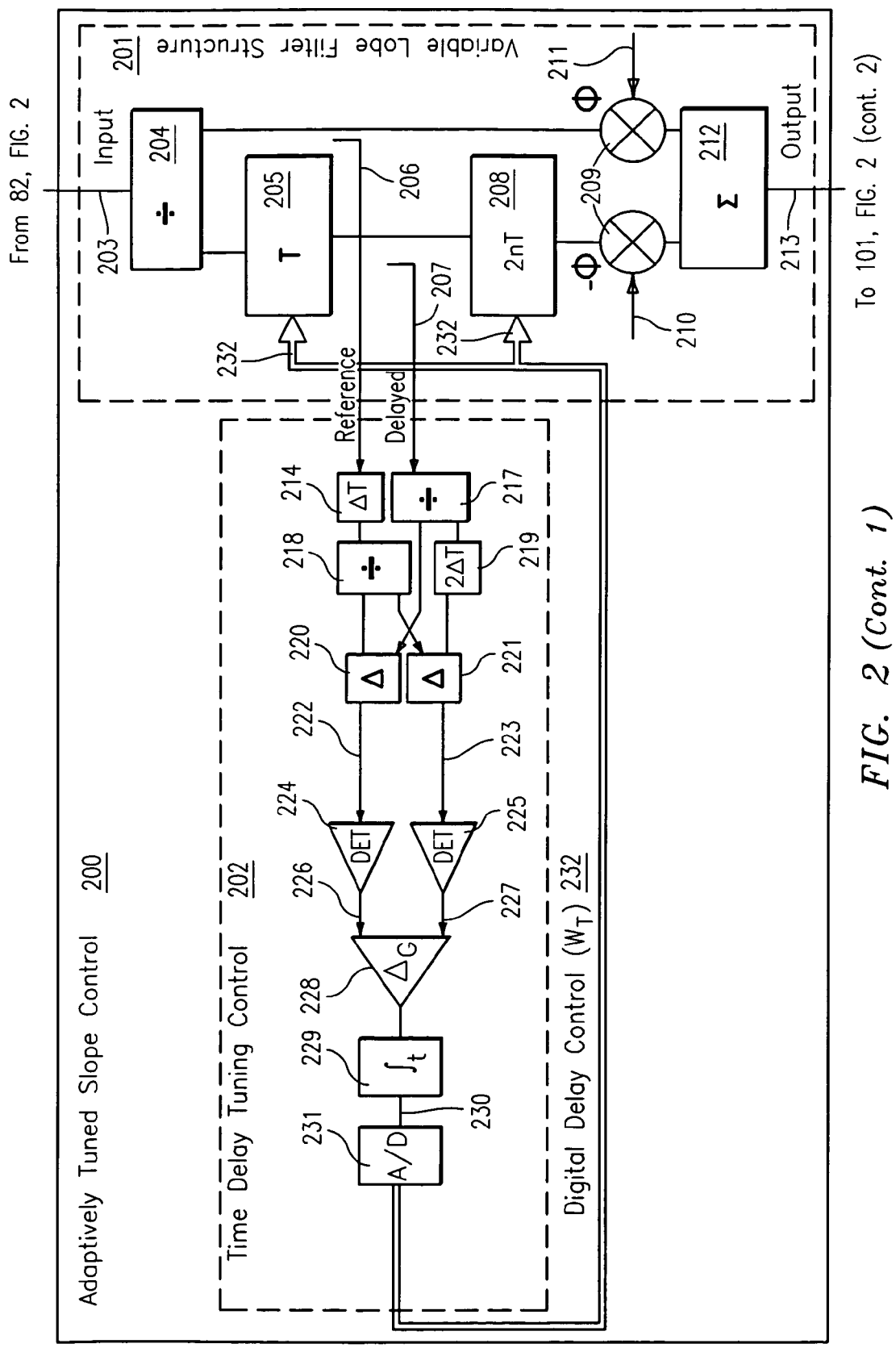
FIG. 2 (Cont. 1)

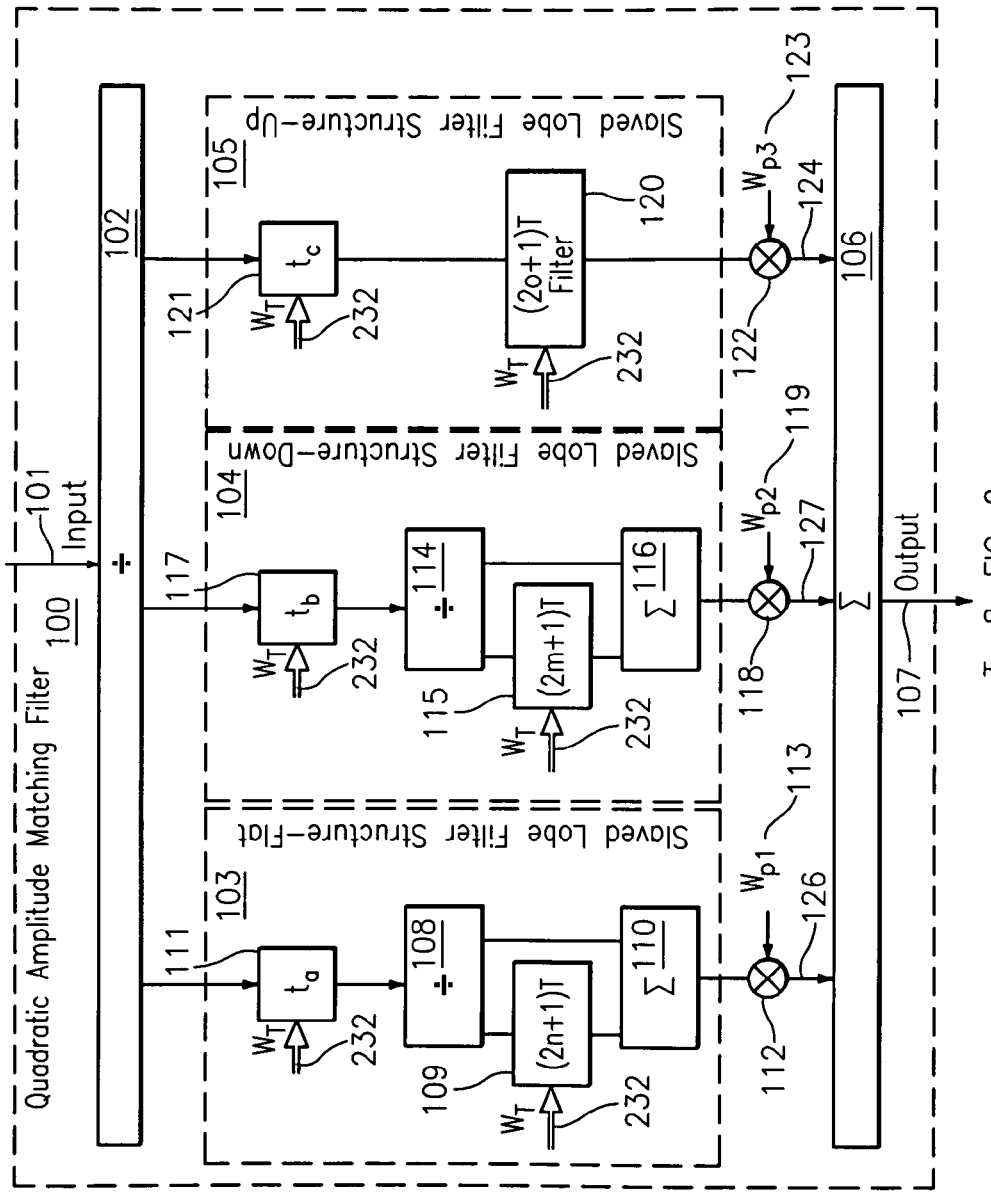
FIG. 2 (Cont. 2)

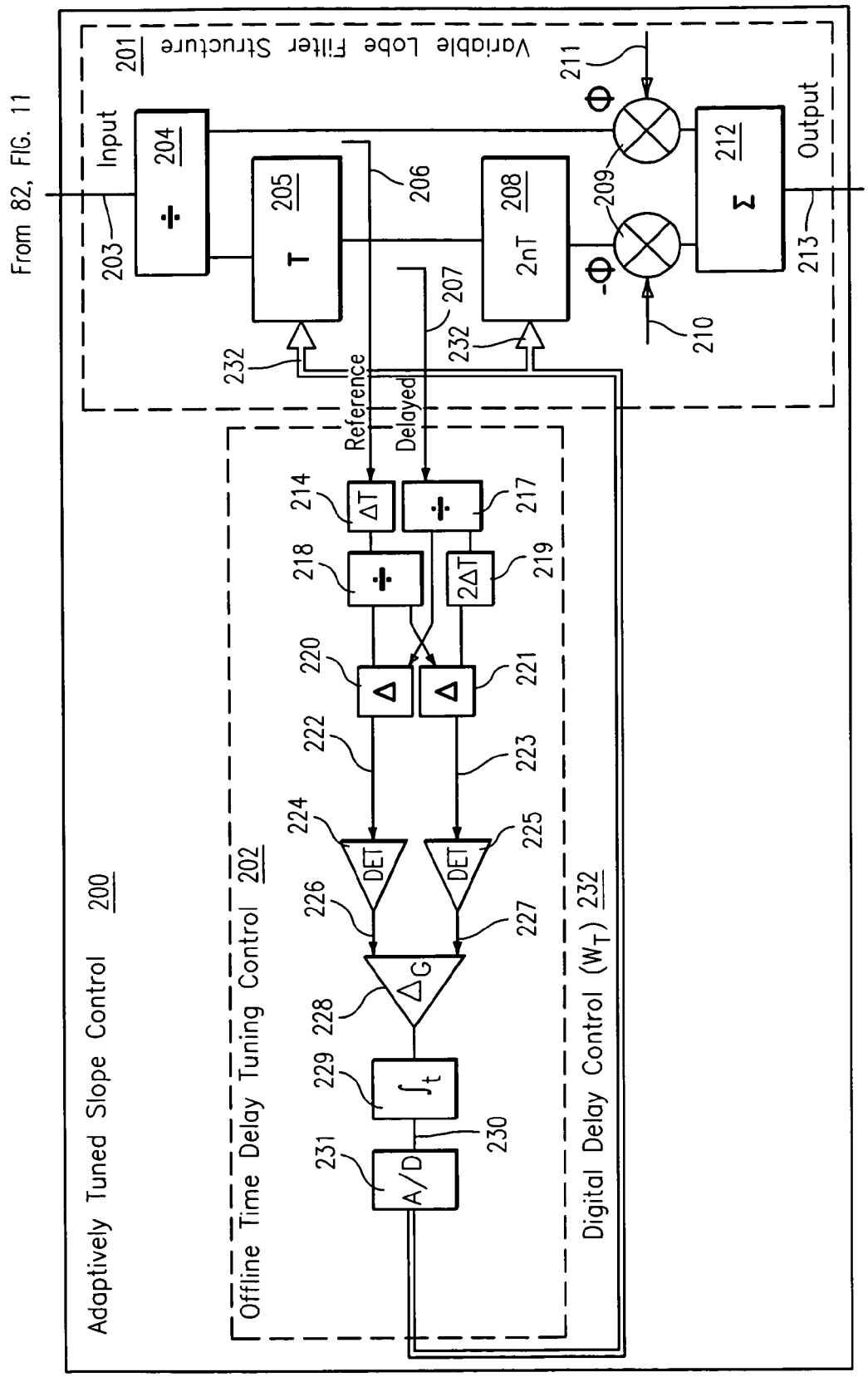
FIG. 11 (Cont. 1)

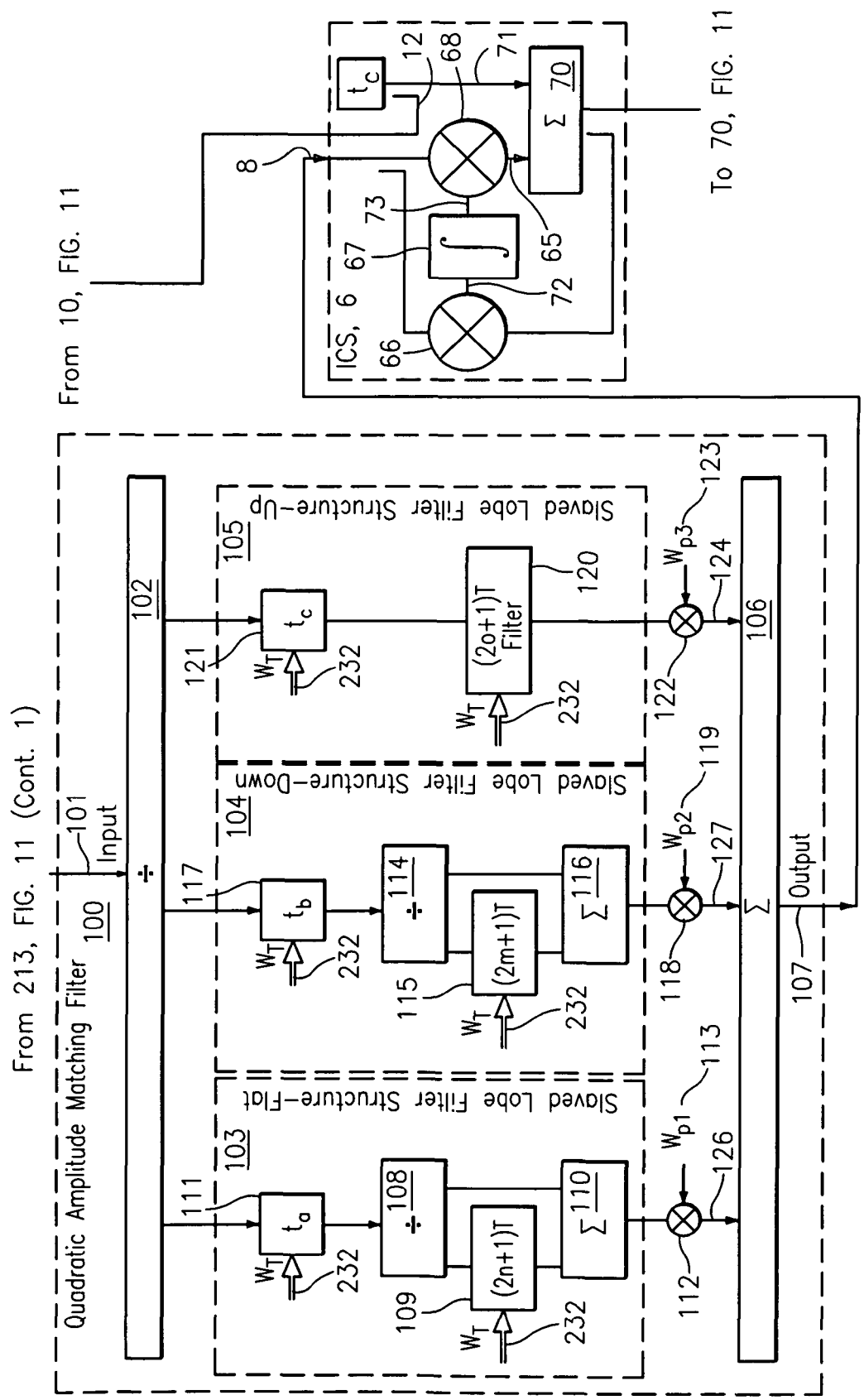
FIG. 11 (Cont. 2)

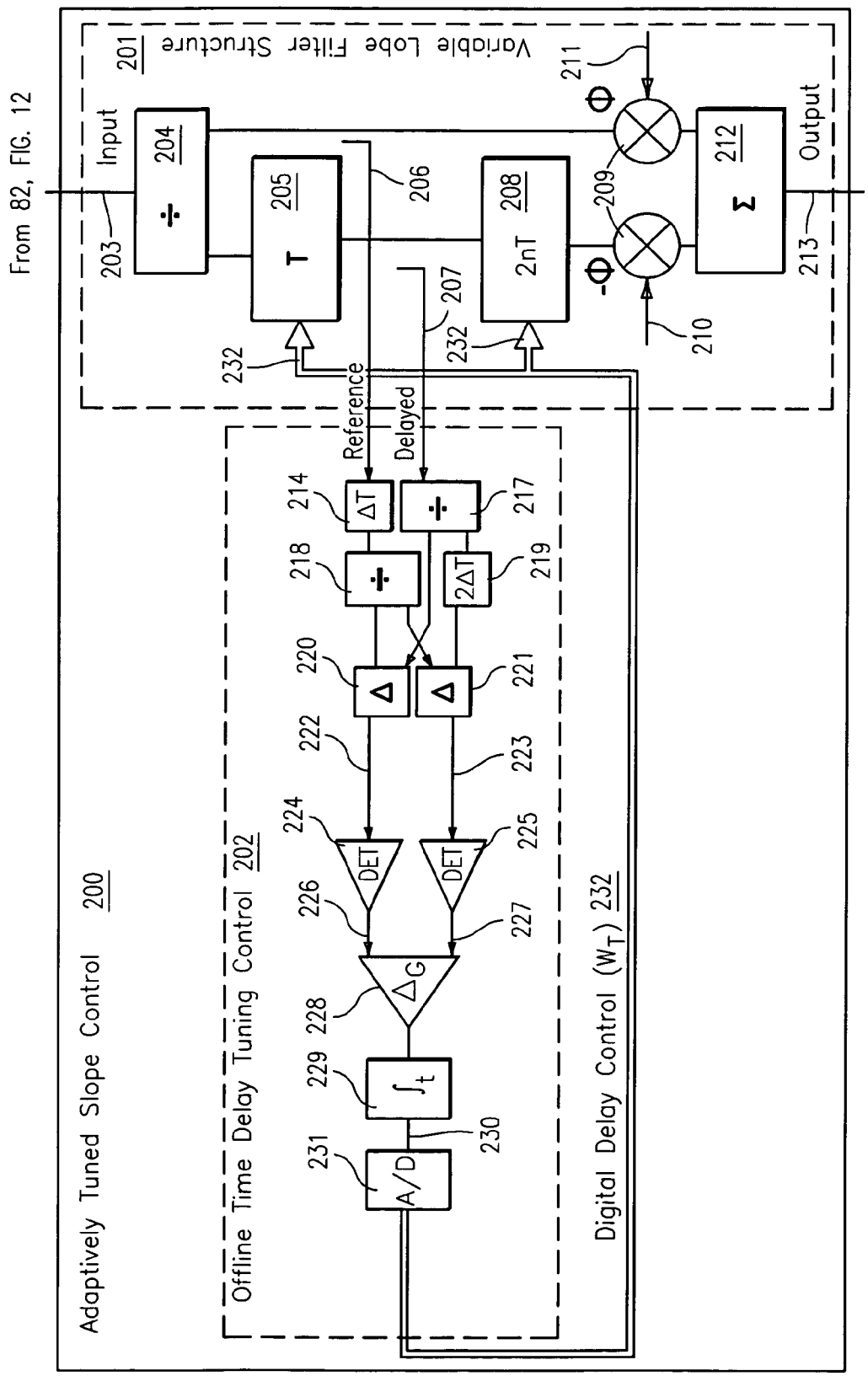
FIG. 12 (Cont. 1)

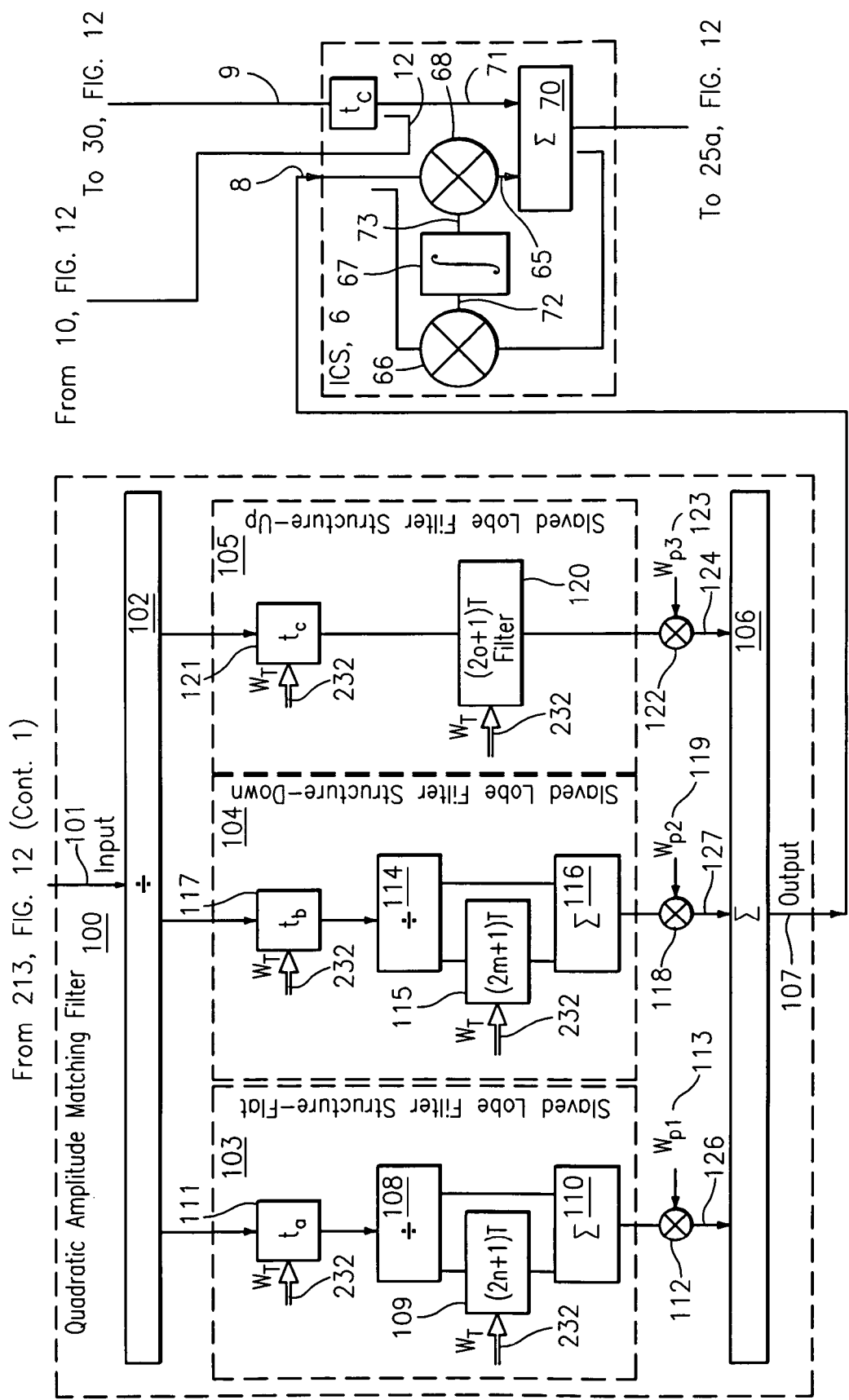
FIG. 12 (Cont. 2)

INTEGRATED INTERFERENCE CANCELLATION SYSTEM ARCHITECTURE WITH DISTORTION CORRECTION

BACKGROUND OF THE INVENTION

This application incorporates herein by reference the following four applications, entitled: (1) VARIABLE TIME DELAY CONTROL STRUCTURE FOR CHANNEL MATCHING; (2) TUNING AMPLITUDE SLOPE MATCHED FILTER ARCHITECTURE; (3) QUADRATIC AMPLITUDE CONTROL CIRCUIT FOR COSITE INTERFERENCE CANCELLATION; and (4) OFF-LINE CHANNEL TUNING AMPLITUDE SLOPE MATCHED FILTER ARCHITECTURE, filed concurrently herewith.

FIELD OF THE INVENTION

The invention relates to the field of radio communication and, in particular, to the reduction of interference in signals coupled from a transmission antenna into a local receive antenna in the presence of a local multipath.

DESCRIPTION OF THE RELATED ART

Unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. The effects of interference can be some combination of the absence of usable output from a receiver, false signals from a receiver, and malfunction of a device which is operated by the receiver. During emergency situations, the loss and corruption of the desired signal can be critical.

Unwanted signal interference is generally caused by modulation of signals provided to the receiver by the carrier waves, or by the wideband noise, generated by collocated transmitters. Unwanted signal interference also occurs when frequency-hopping transmitters are transmitting signals at frequencies that are substantially close to the frequency of the desired receiver signal (i.e., co-channel operation). Unwanted signal interference is also caused by "pseudo white-noise" generated by transmitters over a wide band of frequencies on either side of the transmitter's operating frequency. It is often found in collocated transceiver systems that this "pseudo white-noise" reaches unacceptable levels within the operating band of adjacent receivers. Unwanted signal interference is also attributed to signals (i.e., spurious emissions) generated by transmitters at odd harmonics of the fundamental frequency of the transmitter output signal. This is caused by the non-linear transfer characteristics of amplifiers in the transmitter chain, or by passive inter-modulation at the transmitter or receiver antenna connectors.

In order to substantially reduce and eliminate the undesired interfering signals while maintaining the spatial benefits afforded by proximately locating transceivers, especially frequency-hopping transceivers, several signal processing techniques have been proposed. These techniques include agile filtering, agile filtering with multicoupling and interference cancellation.

When the signal noise and spurious sidebands generated by the interfering transmitter are strong, broadband, and scenario dependant, standard interference cancellation is inadequate. Changes in the scenario surrounding the platform may vary the coupling between the transmitter and the protected receiver and thus require adjustment of system parameters.

Interference cancellation involves sampling the transmitter output signal in order to eliminate from the received signal, any interfering signal having a frequency proximate to the receiver carrier frequency. In co-site environments, a collocated source usually interferes with the receiver due to the finite isolation between transmit and receive antennas. This interference in a co-site environment is a combination of several factors, desensitization caused by one or more nearby high-power transmitter carriers and wideband moderate to low-power interference components associated with those carriers. These interference components are received by the collocated radio and degrade system operation. The nearby high-power transmitter carrier signals could simply exist as a part of the platform signal environment. Further, the interfering signals may be classified as either cosite or remote interferers. A cosite interferer is physically collocated with the receiver on a platform permitting a physical circuit connection from the interference generator to the receiver. A remote interferer is located far enough from the receiver to preclude a physical circuit connection.

A typical Interference cancellation system utilizes a correlation-based adaptive controller using feedback derived after the cancellation process. The system takes a sample of an interference signal and adjusts the magnitude and phase such that the result is equal in amplitude and 180° out of phase with the interference signal at the input of the receiver. The vector sum of the two signals will cancel, leaving only the signal of interest. In practice, however, the two signals are not identical, due to unwanted distortion in the reference path and differences in signal path lengths. Cancellation performance is a function of amplitude and phase match between the interference signal and the sampled signal. Transmission path distortions include time delay, magnitude amplitude and phase distortion, linear amplitude and phase distortion, and parabolic distortion, each adding a level of performance enhancement but also adding to system complexity and difficulty in implementing the corrections.

To suppress a wideband interference signal, the performance of a cancellation system is directly proportional to the match between the sampled transmission cancellation signal and the receive path interference signal across the signal bandwidth. The interference cancellation system (ICS) compensates for minor corrections and component drift by controlling a complex weight that implements a flat phase and amplitude control in the adaptive control loop (ACL) to correct the magnitude, amplitude and phase errors between the two. The receive path interference signal provided to the ICS is disrupted by signal distortions in time of arrival, linear and quadratic amplitude, and linear and quadratic phase. The sampled transmission cancellation signal must be adjusted to match each of these distortion parameters of the distorted receive path signal as closely as possible to achieve complete nulling of the received interference signal. This becomes more difficult with today's broadband signals because individual circuits can implement adjustments of any one of these parameters to the sampled transmission signal but may contribute their own distortion error on a separate parameter.

A need therefore exists for a system and method for continuously adjusting for; (1) changes in the transmitted signal (i.e. frequency tuning), (2) a changing propagation environment, and (3) self-induced distortions of the correcting circuits. This system would then correct for frequency tuning and each variant of time, amplitude, and phase distortion implied upon the propagated signal in its path to the receive antenna and correct self-induced distortions upon the sampled transmission signal to match the two paths at the point of cancellation, thus maximizing the interference cancellation achievable by the ICS.

The present disclosure addresses these concerns by providing an architecture for minimizing mismatch errors by (1) concatenating multiple interference cancellation techniques and (2) using a feedback point following all matching circuits as the control for all sampled transmission parameter corrections to effectively null a received interference signal in a single integrated system.

SUMMARY OF THE INVENTION

It is therefore an object of the present disclosure to provide a method and apparatus for reducing the effects of interference between collocated transceivers.

It is an object of the present disclosure to provide a method and apparatus in which proximately located transceivers can simultaneously transmit and receive independent signals without substantially affecting the quality of a desired signal reception.

It is another object of the present disclosure to eliminate the effects of interference between collocated transceivers utilizing interference cancellation.

It is a more particular object of the present disclosure to provide an architecture combining multiple independent distortion correction techniques in a single integrated system.

The present disclosure provides improved rejection of an interfering signal coupled from a transmission antenna into a local receive antenna in the presence of local multipath. More particularly, a system of the present disclosure includes a common feedback junction, (i.e., a single sampling point used by all parameter matching control loops), for adjusting a number of distortion matching circuits while advantageously maintaining independence of tuning and other independent circuit actions. Thus, as an example, a quadratic amplitude distortion introduced by an amplitude slope matching circuit is immediately sensed and corrected by the quadratic amplitude matching circuit.

The system and associated method of the present disclosure provide improved signal rejection over prior art approaches by improving the composite match, which comprises a combination of corrections to each of the error parameters when added together, i.e., time, linear amplitude (slope), and quadratic amplitude, of the coupled transmission signal and the propagated transmission signal.

In accordance with one embodiment of the present disclosure, a method is provided of reducing interference in signals coupled from a transmission antenna into a local receive antenna in the presence of a local multipath. The method comprising the steps of: a) matching a time delay of a first received signal in a controlled propagation path to a second received signal over an uncontrolled propagation path; b) continuously and automatically tuning a lobed amplitude slope matching filter (ASMF) to the first received signal to allow tracking of the first received signal to match a dynamically changing amplitude slope of the second received signal; c) continuously and automatically tuning a quadratic amplitude matching filter (QAMF) to an inserted signal to allow tracking of the inserted signal to match a dynamically changing quadratic amplitude distortion of the inserted signal; d) acquiring a first error measurement signal responsive to an adaptive control loop for adjusting a complex weighting of the delayed coupled signal with current match to maximally cancel the propagated received signal, e) acquiring a second error measurement signal responsive to step (a) of matching a time delay of the first received signal in a controlled propagation path to a second received signal over an uncontrolled propagation path; f) acquiring a third error measurement signal responsive to step (b) of continuously and automatically tuning a lobed amplitude slope matching filter (ASMF) to the first received signal to allow tracking of the first received signal to match a dynamically changing amplitude slope of the inserted signal; g) acquiring a fourth error measurement signal responsive to step (c) of continuously and automatically tuning a quadratic amplitude matching filter (QAMF) to the first received signal to match a dynamically changing quadratic amplitude slope distortion of the second received signal; and h) repeating steps (a-g) until the first, second, third and fourth error measurement signals are minimized.

According to one aspect of the method described above, dynamic adjustment of the time-delay element considers changing delays of other inserted matching techniques, such as, for example, amplitude slope matching and/or quadratic amplitude matching, in dependence upon the most recent settings.

In accordance with one embodiment of the present disclosure, a method is provided of reducing interference in signals coupled from a transmission antenna into a local receive antenna in the presence of a local multipath. The method comprising the steps of: a) matching a time delay of a first received signal in a controlled propagation path to a second received signal over an uncontrolled propagation path; b) continuously and automatically tuning a lobed amplitude slope matching filter (ASMF) to the first received signal to allow tracking of the inserted first received signal to match a dynamically changing amplitude slope of the second received signal using an offline process; c) continuously and automatically tuning a quadratic amplitude matching filter (QAMF) to an inserted first received signal, to allow tracking of the inserted signal to match a dynamically changing quadratic amplitude distortion of the second received signal; d) acquiring a first error measurement signal responsive to an adaptive control loop for adjusting a complex weighting of the delayed coupled signal with current match to maximally cancel the propagated received signal, e) acquiring a second error measurement signal responsive to step (a) of matching a time delay of a first received signal in a controlled propagation path to a second received signal over an uncontrolled propagation path; f) acquiring a third error measurement signal responsive to step (b) of continuously and automatically tuning a lobed amplitude slope matching filter (ASMF) to the first received signal to allow tracking of the first received signal to match a dynamically changing amplitude slope of the inserted signal; g) acquiring a fourth error measurement signal responsive to step (c) of continuously and automatically tuning a quadratic amplitude matching filter (QAMF) to the first received signal to match a dynamically changing quadratic amplitude slope distortion of the second received signal; and repeating steps (a-g) until the first, second, third and fourth error measurement signals are minimized.

In different embodiments, the system may be implemented in discreet components or alternatively as a MMIC. Time delays can be implemented as either a switched delay or a continuously variable delay through an analog control voltage.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION OF THE INVENTION

Figure 1:
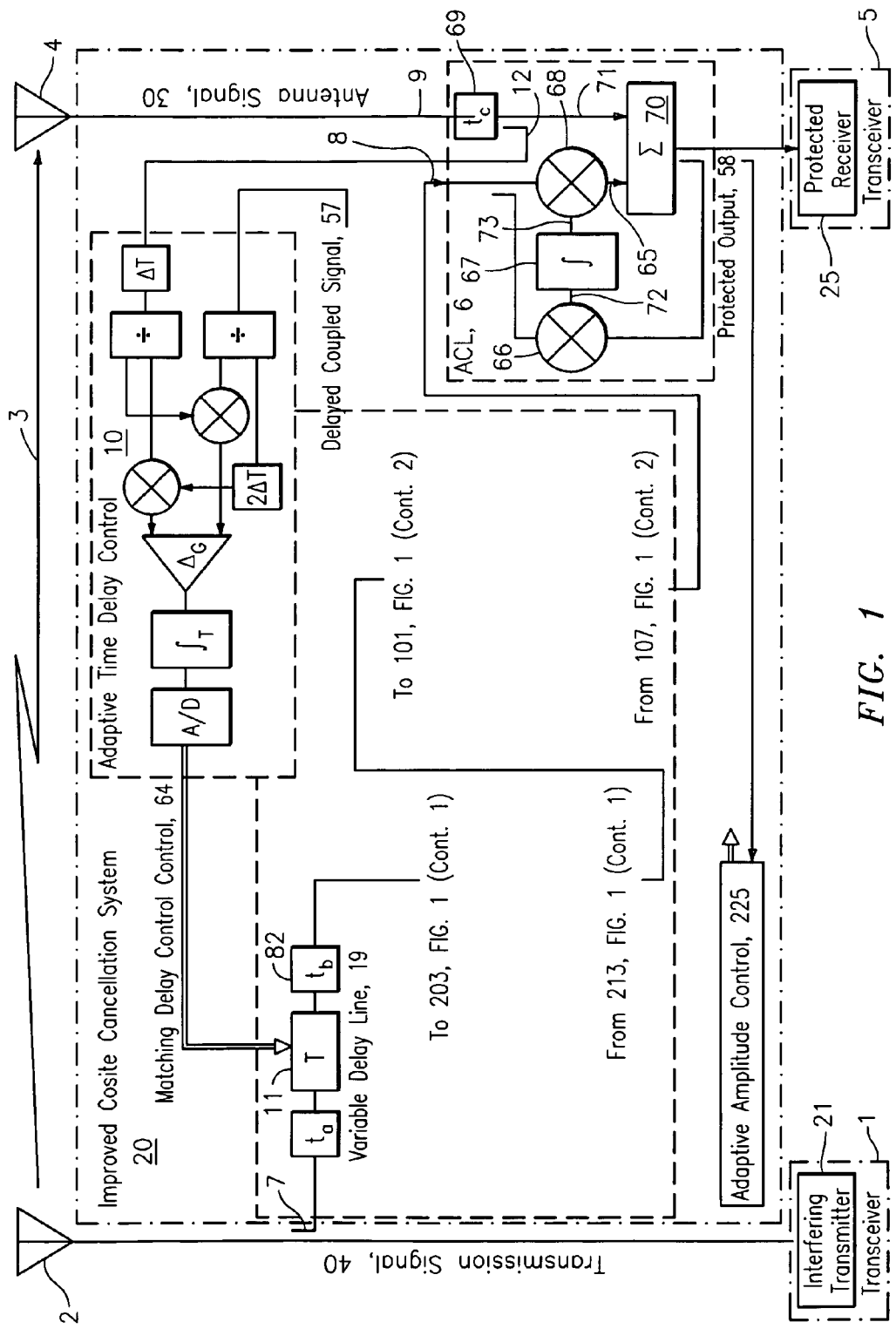
FIG. 1 illustrates the general block diagram of an improved cosite interference cancellation system, according to one embodiment.
Figure 1:
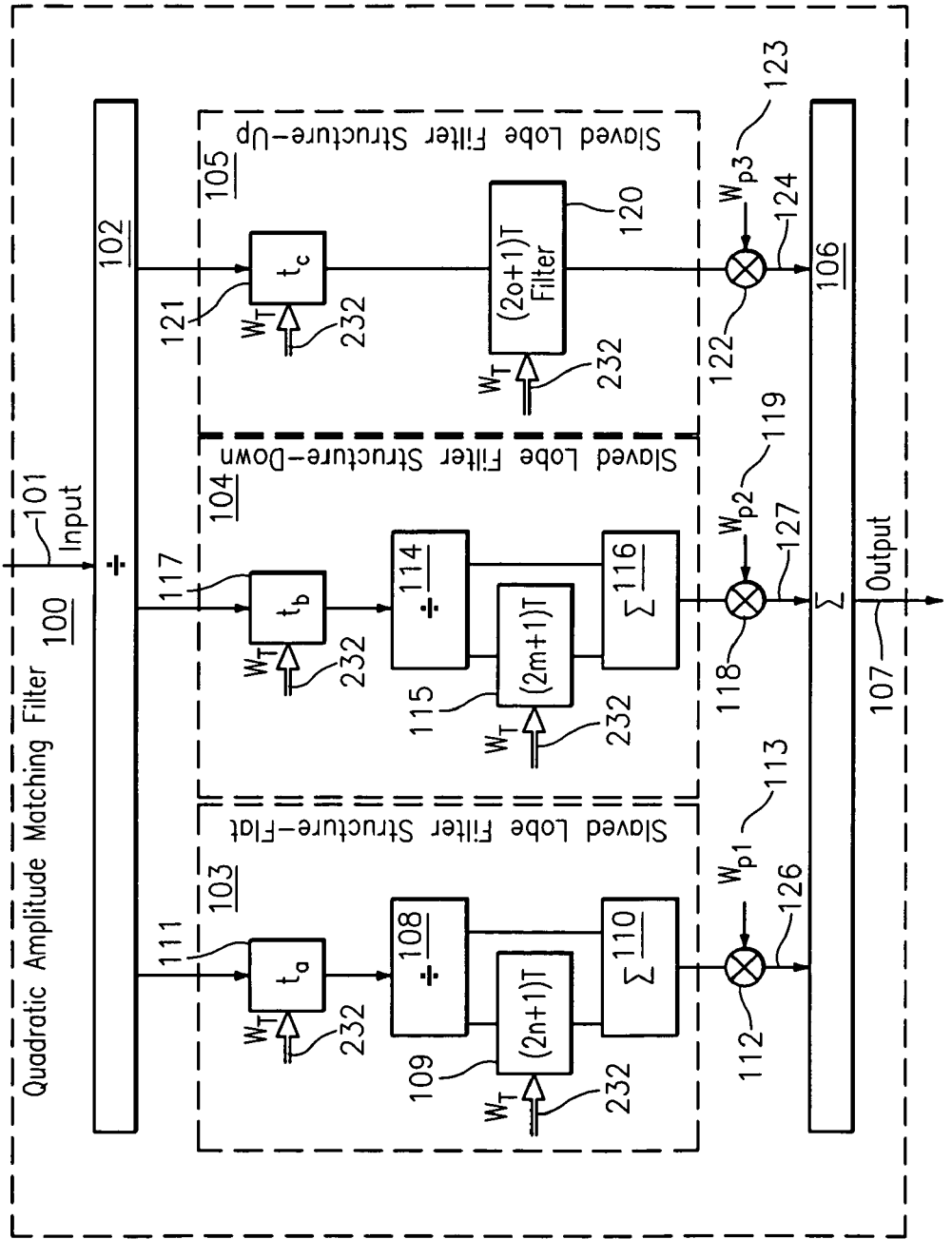

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure is directed to a single integrated cancellation system and methods which combines multiple independent and near independent signal distortion correction systems to improve total system performance.

Referring now to the drawings, FIG. 1 is a circuit diagram for illustrating an improved cosite cancellation circuit 20 for elimination of interfering signals between radio transmitter 21, as an element of transceiver 1, and receiver 25, as an element of transceiver 5, where system dynamics cause changes in the coupling between transmit antenna 2 and receive antenna 4, antennas co-located on a platform, according to one embodiment.

It should be understood that each of the transceivers 1, 5 function independent of the other such that they alternate in being viewed as either the interfering transmitter or protected receiver depending upon the specific needs of the user. However, the system description will only address a single functional aspect for ease of explanation. The transceivers 1, 5 can operate at any RF frequency including, for example, in the high frequency (HF), very high frequency (VHF) and ultra-high frequency (UHF) spectrums.

The improved cosite cancellation circuit 20 for the elimination of interfering signals between radio transceivers 1, 5, is adapted to be coupled to transceiver 5, in the illustrative embodiment, or other type of device, known or envisioned, capable of receiving electronic signals. The transceiver 1 operating in the transmission mode produces electronic signals for transmission via antenna 2 of transceiver 1. Substantially contemporaneously to this signal transmission, other electronic signals are received by antenna 4 and provided to at least transceiver 5 operating in the receiving mode. As is known to happen, in addition to the signals intended to be received by antenna 4, the co-located transmitter 21 also generates noise and distortion signals which interfere with the electronic signals received by the antenna 4 that are to be provided to a receiver 5.

In order to substantially eliminate the effect of the interfering signals generated from transceiver 1, the novel cancellation circuit 20 is electrically coupled to transmission signal 40. In a preferred form of the present invention, a directional coupler 7 is operatively coupled to the output port of transmitter 21. The cancellation circuit 20 receives a sample of the filtered transmission signal corresponding to the transmitter 1 to which it is coupled.

Operation

In operation, transmitter 21 transmits RF transmission signal 40 through antenna 2 which couples spatially 3 either directly or through a multipath environment into a second antenna 4 connected to a receiver 25 on the same platform as interfering transmitter 21. This coupled energy interferes with the reception in the receiver 25 of its desired reception of a distant transmission. The interfering transmitter 21 thus becomes a collocated source of interference. It is desired to protect the receiver 25 from the interfering transmitter 21. The addition of a simple Interference Cancellation System (ICS) consisting of only a coupled adaptive control loop (ACL) 6 can reduce this interference to a limited extent by sampling the transmission signal 7 and feeding it into the auxiliary port 8 of the ACL 6 while antenna signal 30, including both the interfering propagated reference signal and the desired signal, is fed into the reference port 9 of the ACL 6.

In an environment clear of reflective obstacles (e.g., no multi-path sources present), the spatially coupled signal 3 from antenna 2 to antenna 4 would be received unchanged except for the propagation delay and other matching corrections would not be required. However, in a typical multi-path laden environment, the spatially coupled signal 3 is distorted across the band in a number of ways which are constant in a stable environment but vary with a changing multipath environment of a platform in motion, including; propagation delay between antennas, an amplitude slope across the band of interest, and a quadratic amplitude shaping across the band of interest.

Figure 2:
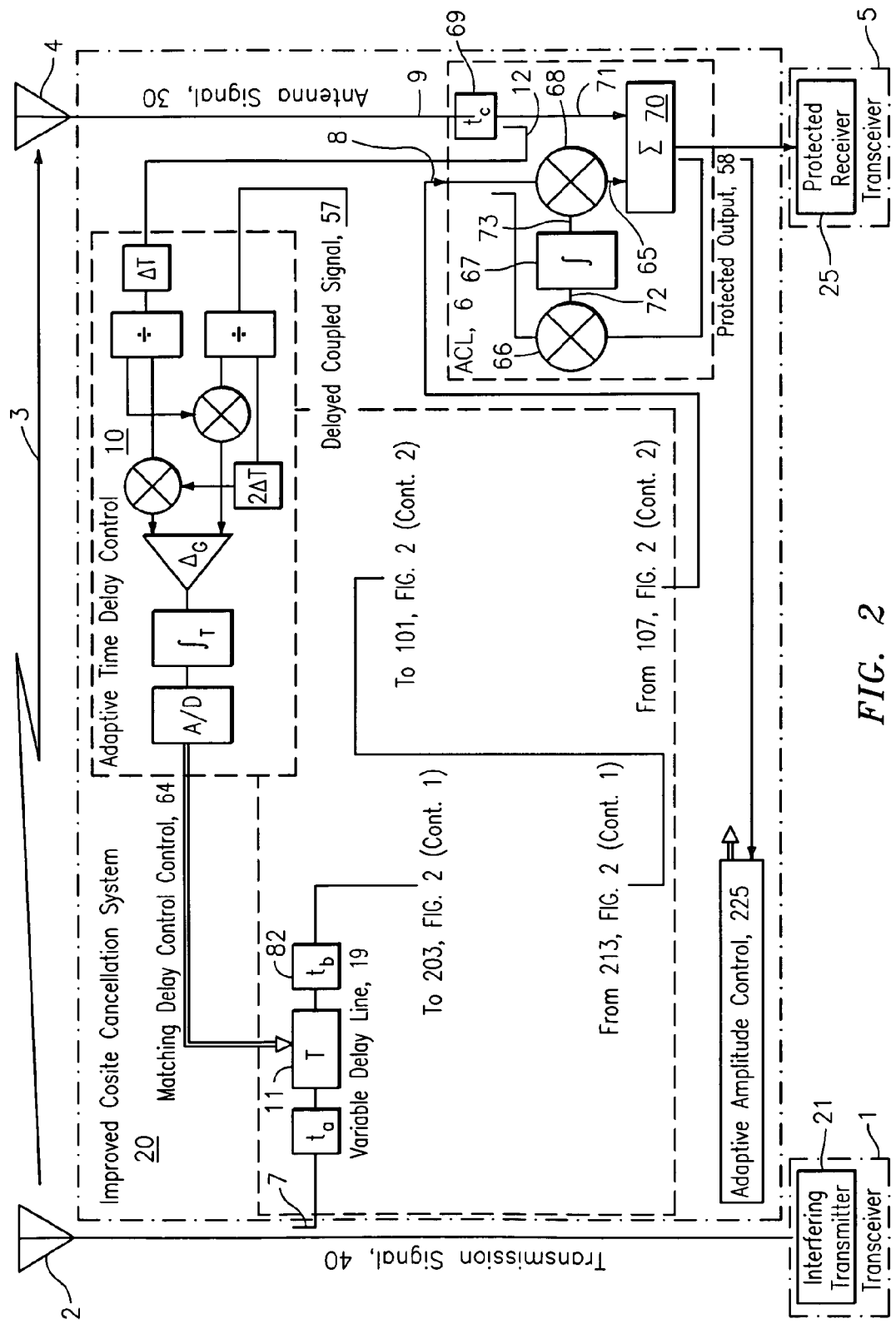
FIG. 2 illustrates the general block diagram of an improved cosite interference cancellation system, according to one embodiment.

FIG. 1 represents a system and method for continuously adjusting the tuning of a lobed filter so that a center frequency of a reference input signal is near the peak of the lobed filter to obtain a quiescent flat slope in the region of the tracked signal spectrum. By providing a continuous adjustment of the lobed filter the need to receive control information from the transmitter to tune an amplitude sloped matched filter is eliminated, thereby overcoming a limitation of the prior art. However, a drawback of this proposed approach is that it requires dithering the inline time delay tuning value which causes a modulation to be applied to the inline signal, even after the system was converged to an appropriate stable solution. Dithering the inline time delay tuning value is undesirable because it reduces the achievable nulling and it introduces the dithering noise to the receiver, thus reducing the demodulation achievable. FIG. 2 represents a system performing the same functions as that of FIG. 1 but without the inline dithering. The first method uses a sequence of changing the inline time delays and then measuring the results before determining a direction of change desired. The second method uses offline differences in time delay to determine the direction so that there is a consistent trend in inline time delay change as the system tunes.

Static v. Dynamic Environments

Figure 3:
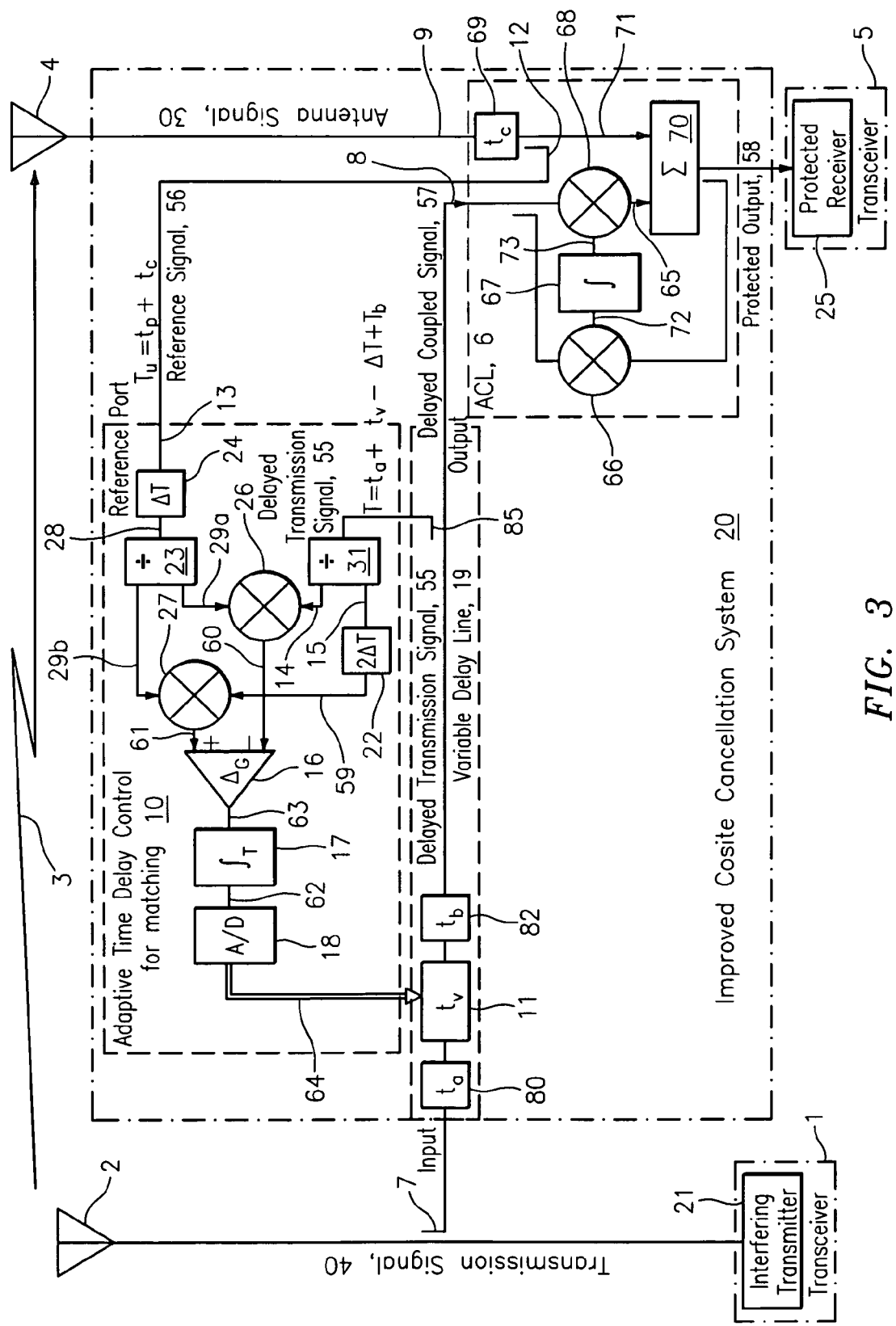
FIG. 3 illustrates a cancellation circuit with a delay time matching circuit to match cosite propagation signal path delays for elimination of interfering signals between radio transceivers, according to one embodiment.

Consider first the change in propagation time in a dynamic scenario. FIG. 3 illustrates an interference cancellation system that includes a matching coupling time delay. In a static environment, the cable delay between sample point 7 and point 8, the input to ACL 6, is ideally adjusted to be the typical coupling delay through space from source antenna 2 to receive antenna 4. This delay is implemented to include any in-line components. In a dynamic environment, as environmental conditions change with time in an unpredictable manner, a variable propagation time delay can be affected upon the propagated signal resulting in an undesirable mismatch between the coupled transmission (i.e., the signal coupled via path 7 to 8) and the propagated transmission (i.e., the signal coupled via path 2-9) limiting the effectiveness of the applied cancellation. To correct a dynamically changing time delay mismatch between the afore-mentioned signals, the interference cancellation system of FIG. 3 provides, in one aspect, an inline variable delay line 19, and an adaptive time delay control 10.

Figure 4:
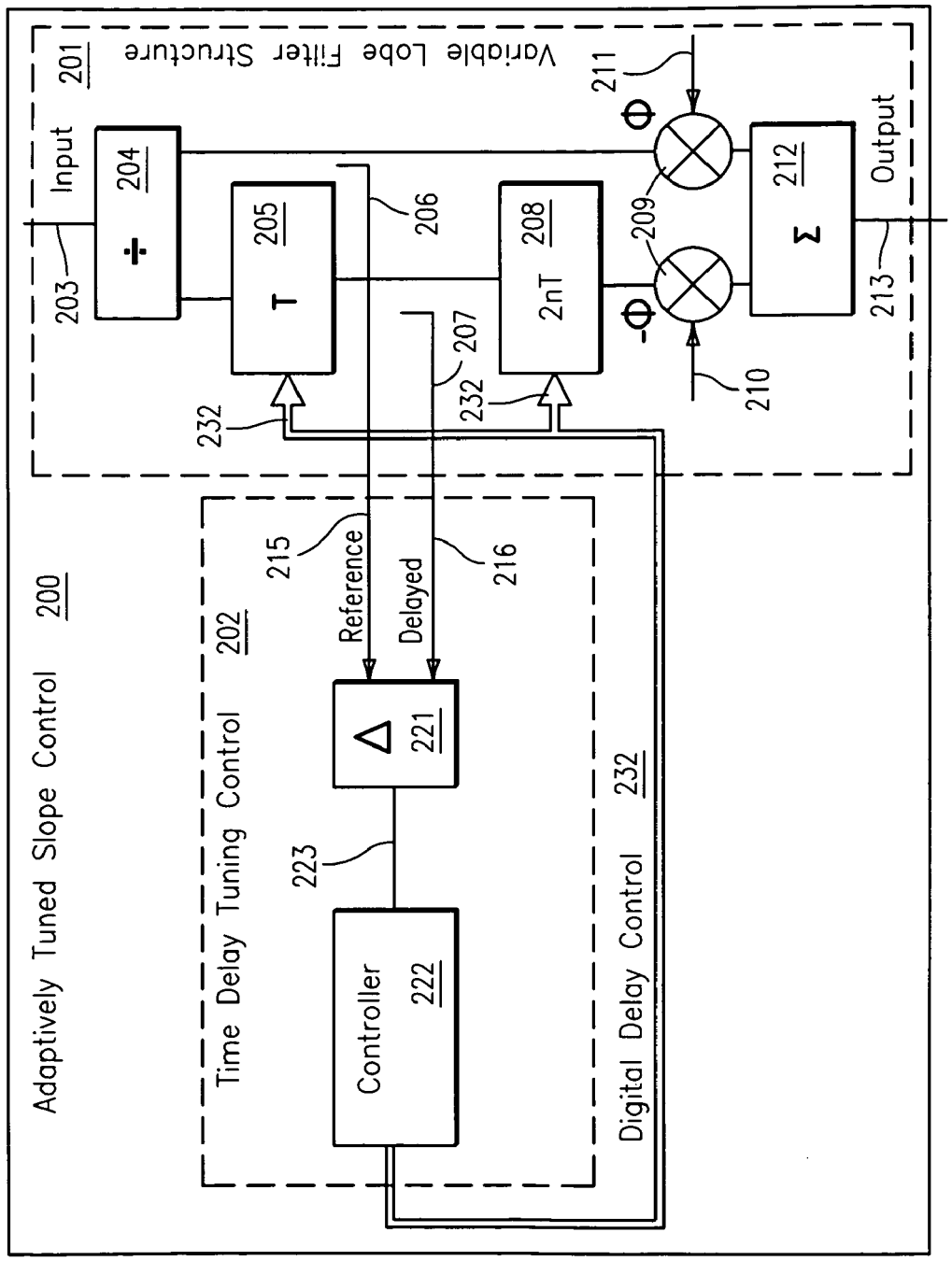
FIG. 4 is an adaptively tuned slope control filter structure with minimum throughput delay and changing delay over time, according to one embodiment.

Similarly, in a dynamic environment, an undesirable mismatch in amplitude slope between the coupled transmission (i.e., the signal coupled via path 7 to 8) and the propagated transmission (i.e., the signal coupled via path 2-9) occurs, limiting the effectiveness of the applied cancellation. The circuit of FIG. 4 provides, in one aspect, a variable lobed filter structure (VLFS) 203 to correct a dynamically changing slope mismatch between the afore-mentioned signals. It does however have a time varying delay equal to $[\frac{1}{2}(2n+1)T+$ offset delay of $\Phi]$, varying with variable delay setting T. As the VLFS is within the coupling delay of FIG. 3 by making it a part of $t_b$ 82 as shown in FIGS. 1 and 2, the variable time delay is corrected by the adaptive time delay control module but the design of variable delay line 19 must accommodate this insertion.

Figure 5:
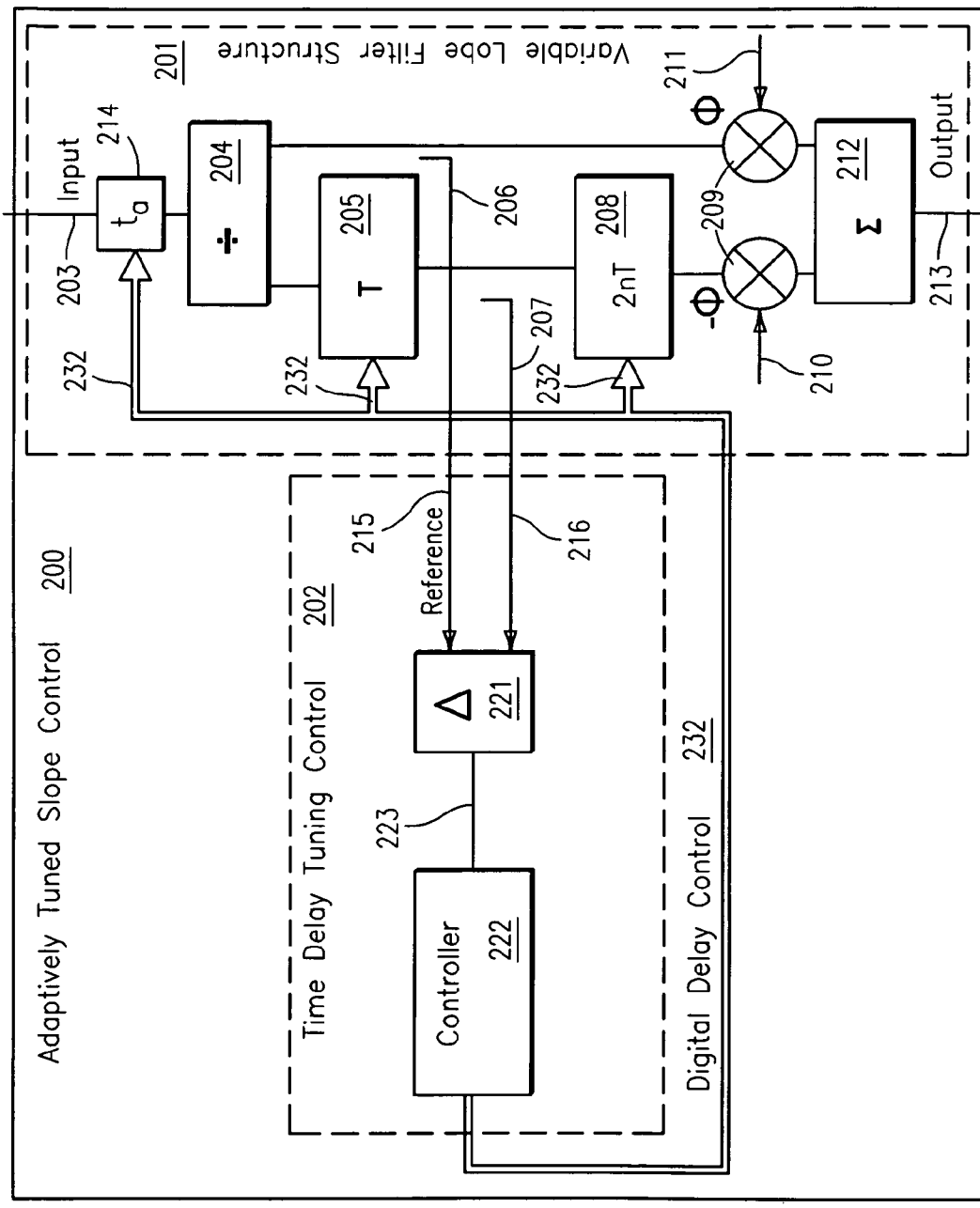
FIG. 5 is an alternate implementation of the adaptively tuned slope control filter structure of FIG. 3, this implementation being capable of constant throughput delay.

FIG. 5 is an alternate embodiment of the adaptively tuned slope control filter structure that has the potential of constant throughput delay by continuously adjusting input delay $t_a$ 214 such that the total throughput delay stays a constant through the VLFS. Referring again to FIGS. 4 and 5, the VLFS 203 is controlled by an offline time delay tuning control 202 to track the inserted signal.

Figure 6:
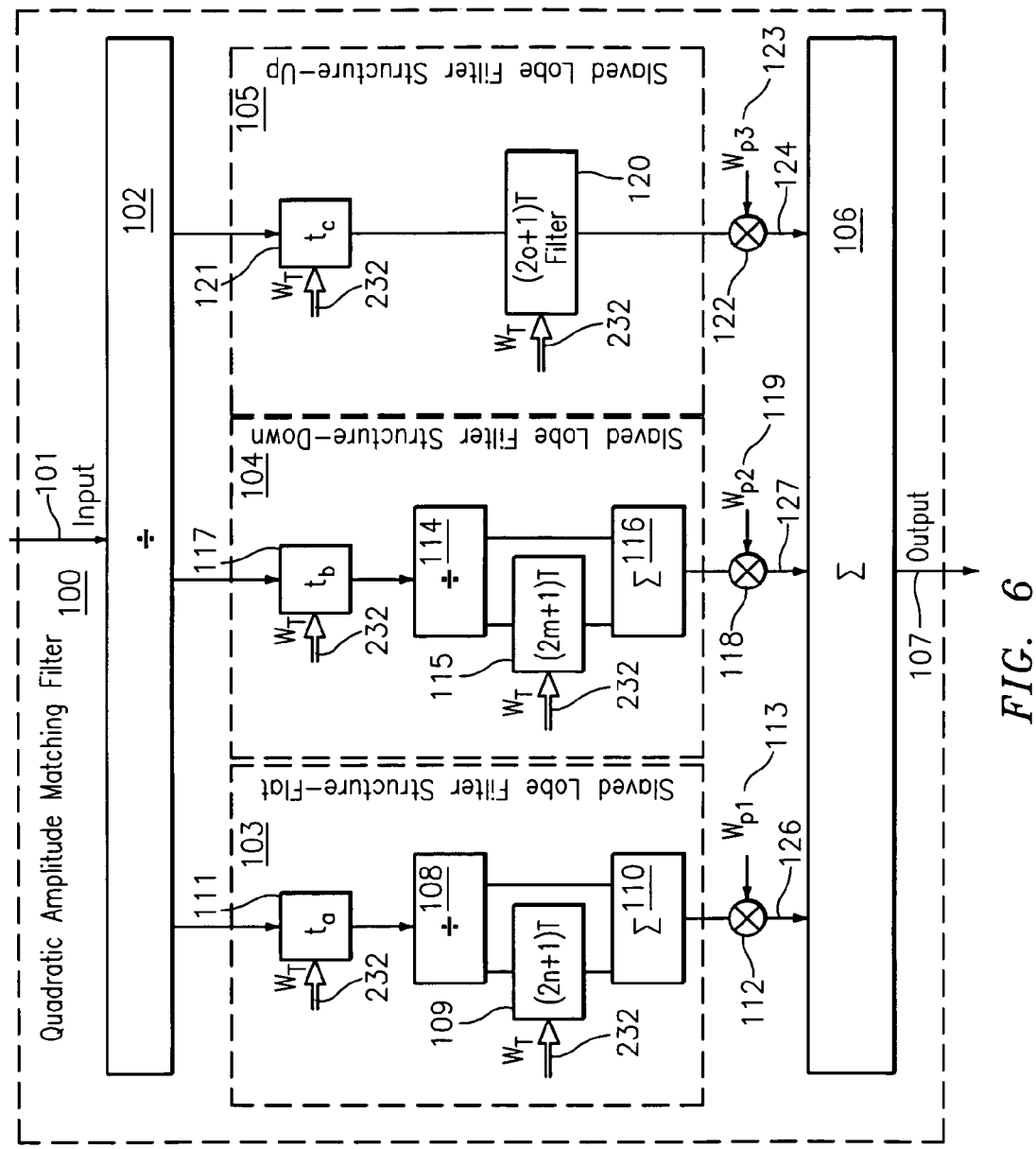
FIG. 6 is a circuit diagram of a quadratic amplitude matching filter (QAMF) structure where the tuning control comes from an external controller, according to one embodiment.
Figure 7:
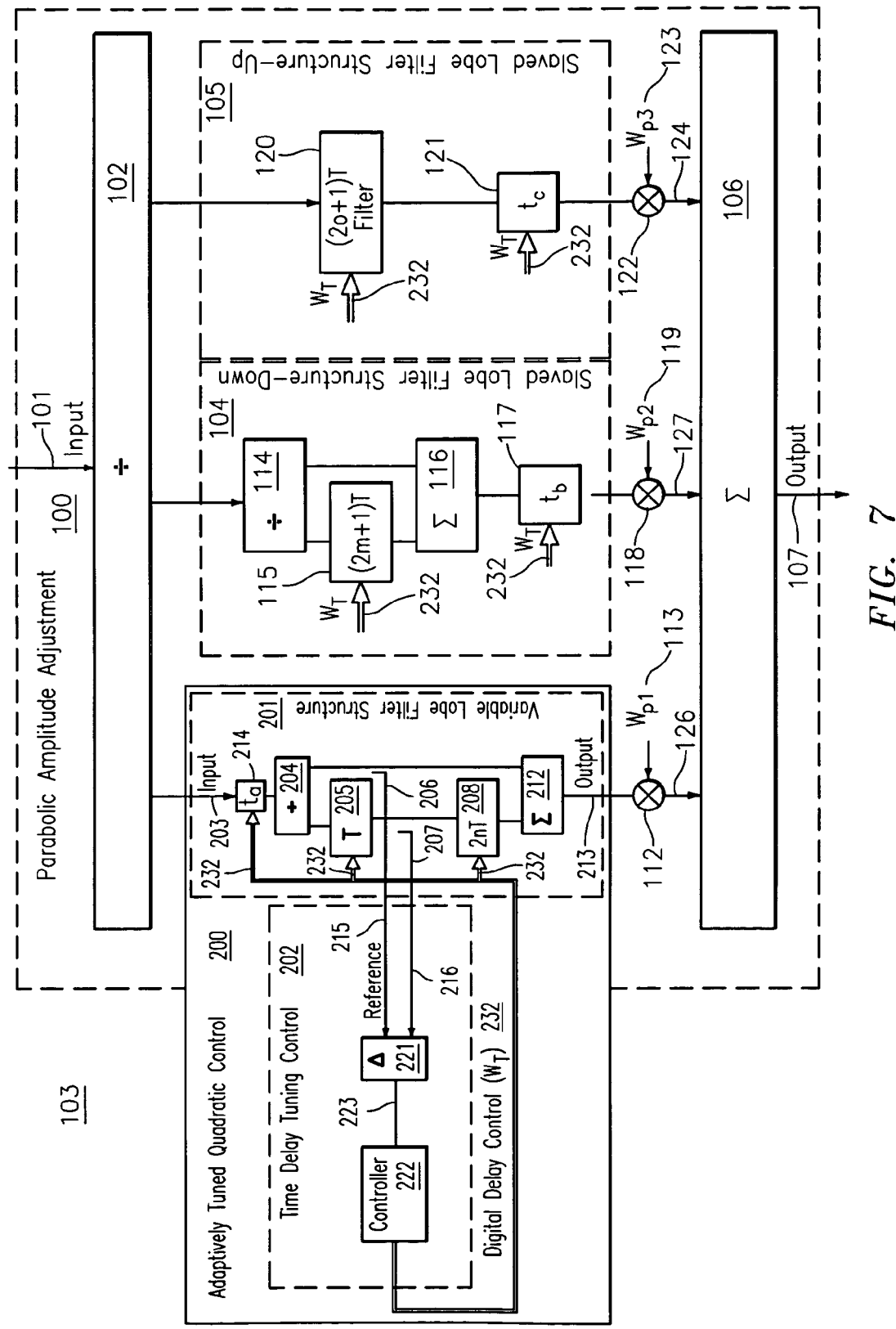
FIG. 7 is a circuit diagram of an adaptively tuned quadratic control (ATQC) structure where the time delay tuning control circuit has been integrated, according to one embodiment.

Again, in a dynamic environment, an undesirable mismatch in the quadratic amplitude shape between the coupled transmission and the propagated transmission occurs, limiting the effectiveness of the applied cancellation. The circuit of FIG. 6 provides quadratic amplitude adjustment in the quadratic amplitude matching filter (QAMF) 100 implemented as a block of three parallel filters 103, 104, 105, each respectively having different characteristics of amplitude shapings across the band of interest and each being formed based upon different odd integer multiples of a basic delay interval T which tunes such structures to a central band of interest of an interfering signal. The three parallel filter blocks include the slaved lobe filter structure-flat block 103, the slaved lobe filter structure-down block 104, and the slaved lobe filter structure-up block 105. Each filter block 103, 104, 105 uses a common digital control signal $W_T$ 129 as a tuning signal to track a center frequency with different relative bandwidths, but these filtering functions also have varying time delay as a function of the digital control signal $W_T$ 129. Each filter thus requires an equalizing delay block to maintain a matching throughput delay through the larger assembly of the QAMF. As the QAMF is shown to be contained within the coupling delay of FIG. 3 by making it a part of $t_b$ 82 as shown in FIGS. 1 and 2, an included in matching calculations by the adaptive time delay control module but the design of variable delay line 19 must accommodate this insertion. The value $W_T$ 129 can be slaved to the VLFS 203 of FIGS. 4 and 5, using the same offline time delay tuning control 202 to track the inserted signal or it can have its own as shown in FIG. 7 if an independent building block is desired.

Both the ASMF and the QAMF have additional throughput time delays that must be considered in time delay match of the coupled transmission signal to the propagated transmission signal. It may be that their inherent delays exceed the propagation delay so that variable delay line 19 of FIGS. 2 and 3 no longer have any adjustment room. That introduces the requirement for $t_c$ 69 in the reference path to provide a pedestal match of any internal delays that cannot be reduced.

Figure 8:
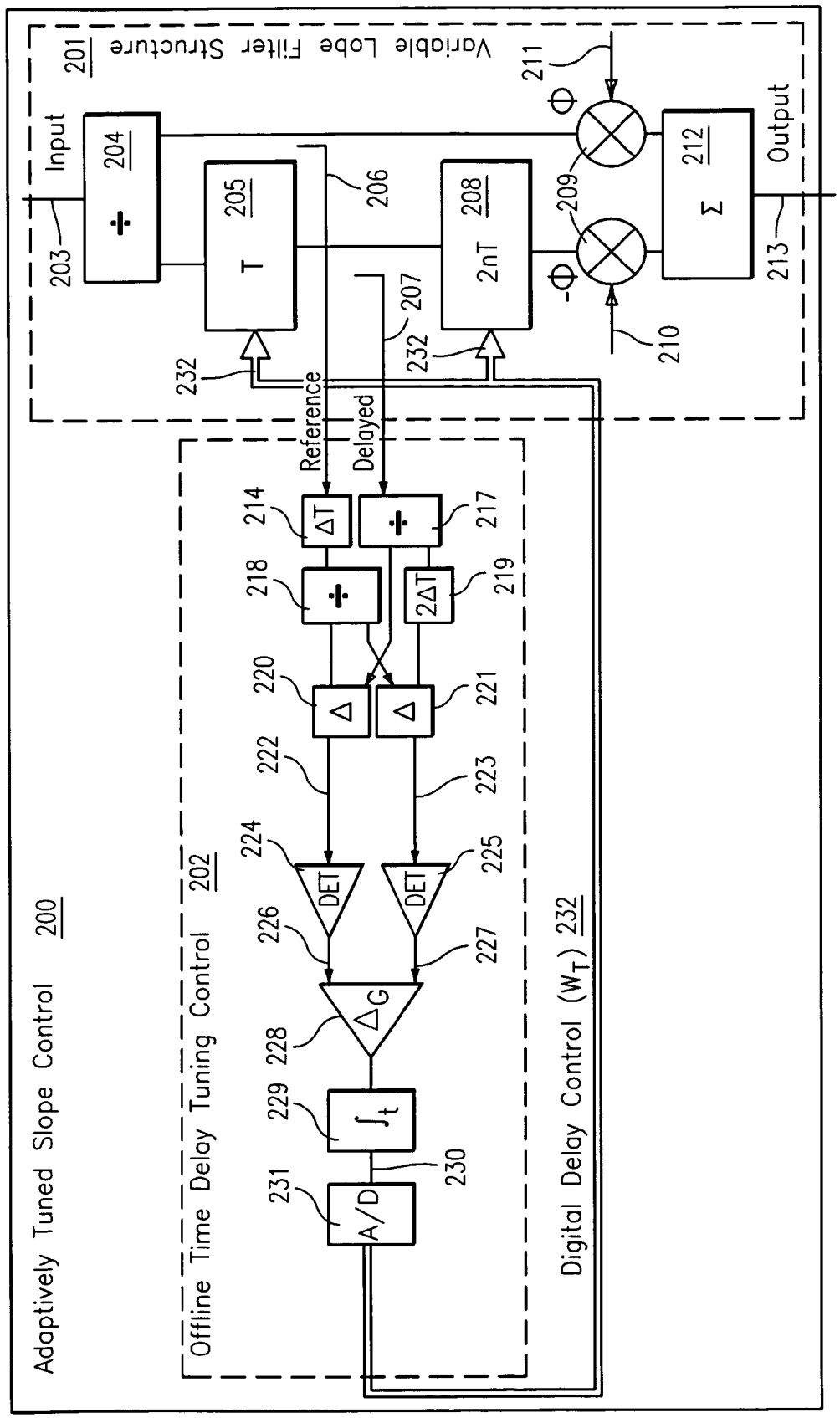
FIG. 8 is an alternate time delay tuning control, this implementation performing all measurements offline to minimize inline distortions, integrated with the adaptively tuned slope control filter structure of FIG. 3 with minimum throughput delay and changing delay over time, according to one embodiment.
Figure 9:
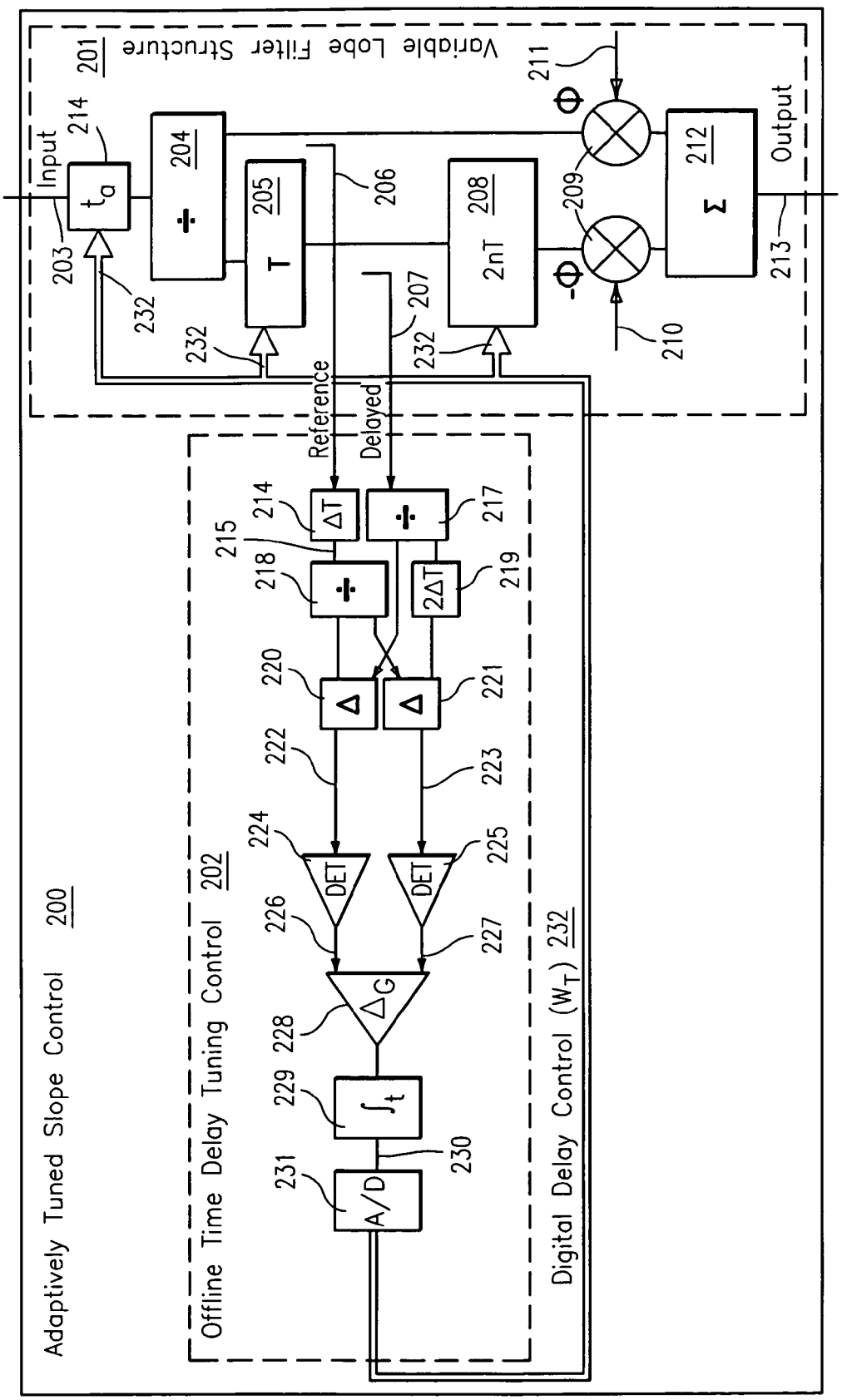
FIG. 9 is the alternate time delay tuning control of FIG. 7 integrated with the alternate implementation of the adaptively tuned slope control filter structure of FIG. 4.

FIGS. 8 and 9 illustrate the substitution of an offline time delay tuning control 202 for the time delay tuning control 202 of FIGS. 3 and 4, and as shown in FIG. 2 as compared to FIG. 1. The advantage of this controller is that it does not make measurement changes to the inline tuning blocks of T 205 and 2nT 208, thus affecting a noise modulation on the coupled transmission signal and thus limiting the nulling performance of the ACL 6 of FIG. 2. This controller will also work for the adaptively tuned quadratic control 200 of FIG. 7.

Figure 10:
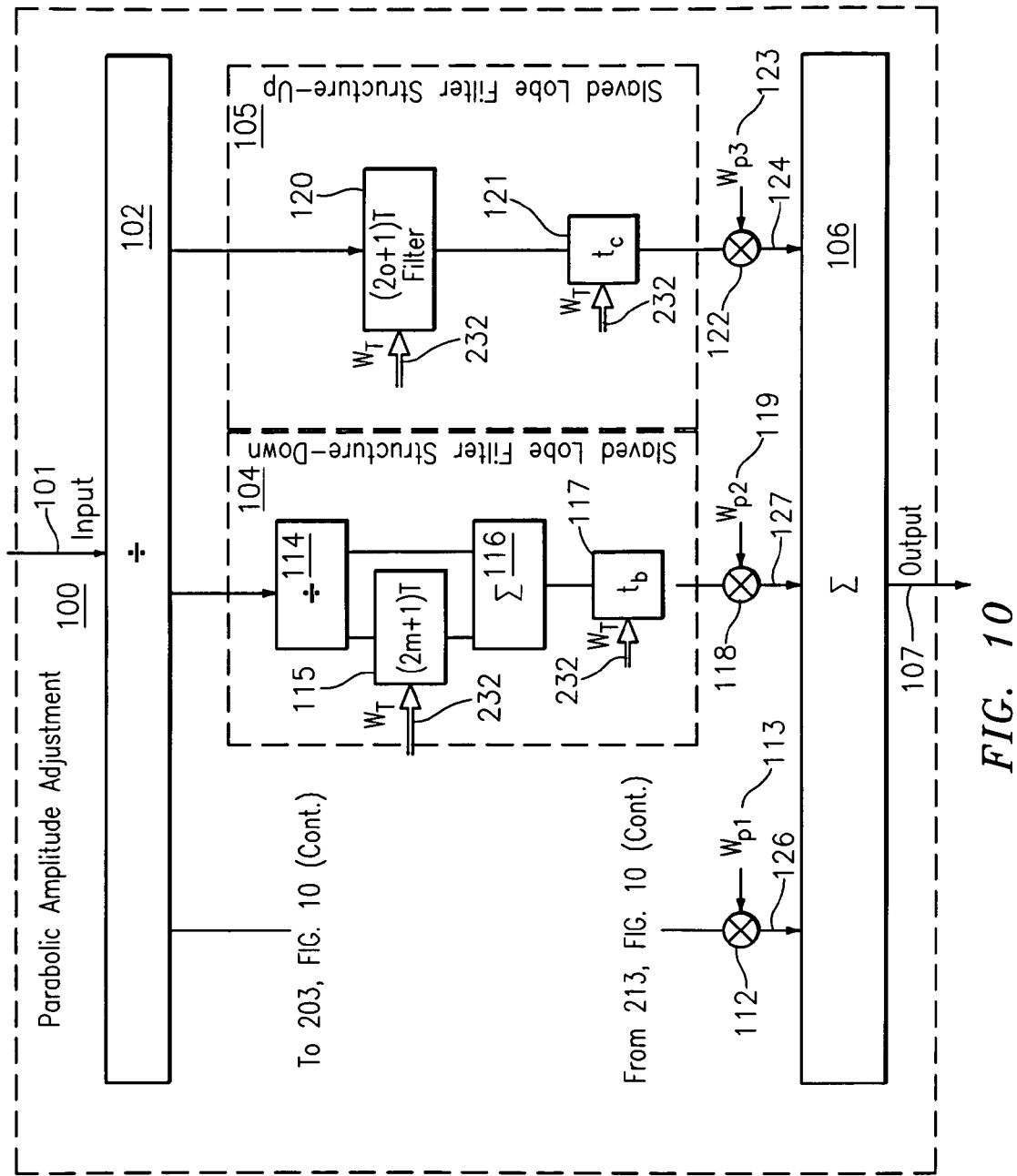
FIG. 10 is the alternate time delay tuning control of FIG. 7 integrated with the adaptively tuned quadratic control (ATQC) structure of FIG. 6.
Figure 10:
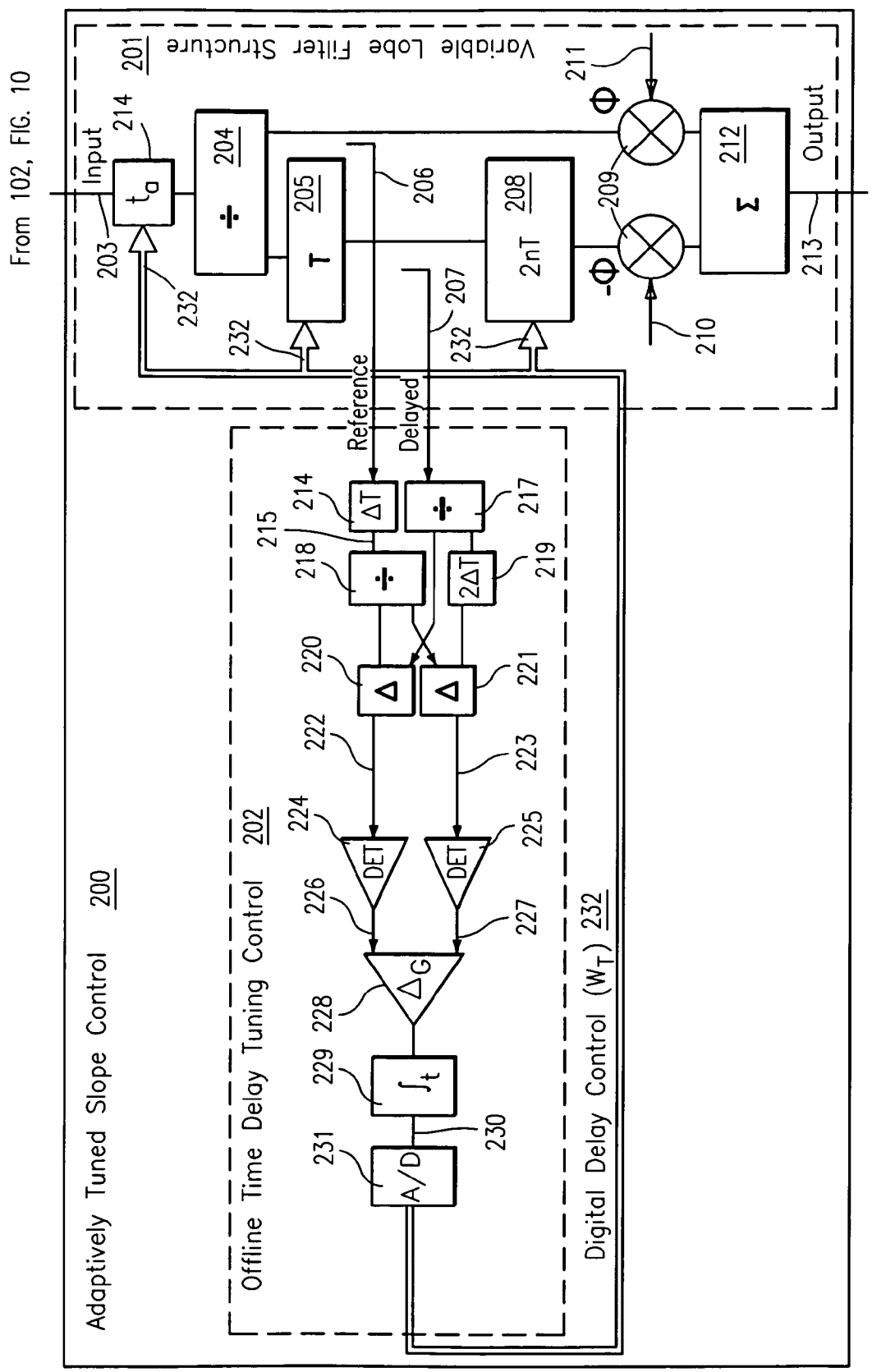

Referring now to FIG. 10 there is shown four co-located interfering transmitters 21a-21d, by way of example and not limitation. Four are shown for ease of explanation. To counteract the multiple interfering transmitters 21a-21d, and thus reduce or minimize cosite interference, the improved cosite interference cancellation system 20 includes a common adaptive slope control 225 of prior art operably coupled to a common summing junction for four improved cosite interference cancellation system 20a-20d with four Adaptive control loops (ACL) 6a-6d. Four of which are shown for ease of explanation and not limitation. In this manner, the cosite interference cancellation process described above with reference to FIGS. 1 and 2 is independently applied to each interfering transmitter 21a-21d to protect the single receiver 25. This figure shows a preferred embodiment with common, shared antenna signal 30, summing junction 70 and feedback signal 71. The functions of adaptive time delay matching through variable delay lines 19a-19d, the variable lobe filter structure (VLFS) 201a-201d and quadratic amplitude matching filter (QAMF) 100 are in-line and must be independent but the function of the adaptive slope control 225 can be shared through multiplexing techniques implemented in prior art of adaptive arrays where the correlation and integration functions were shared. In other embodiments, the ACL summing junctions are daisy-chained for the use of a standard building block at the cost of additional potential noise insertions and longer convergence times because of signal interaction.

Figure 11:
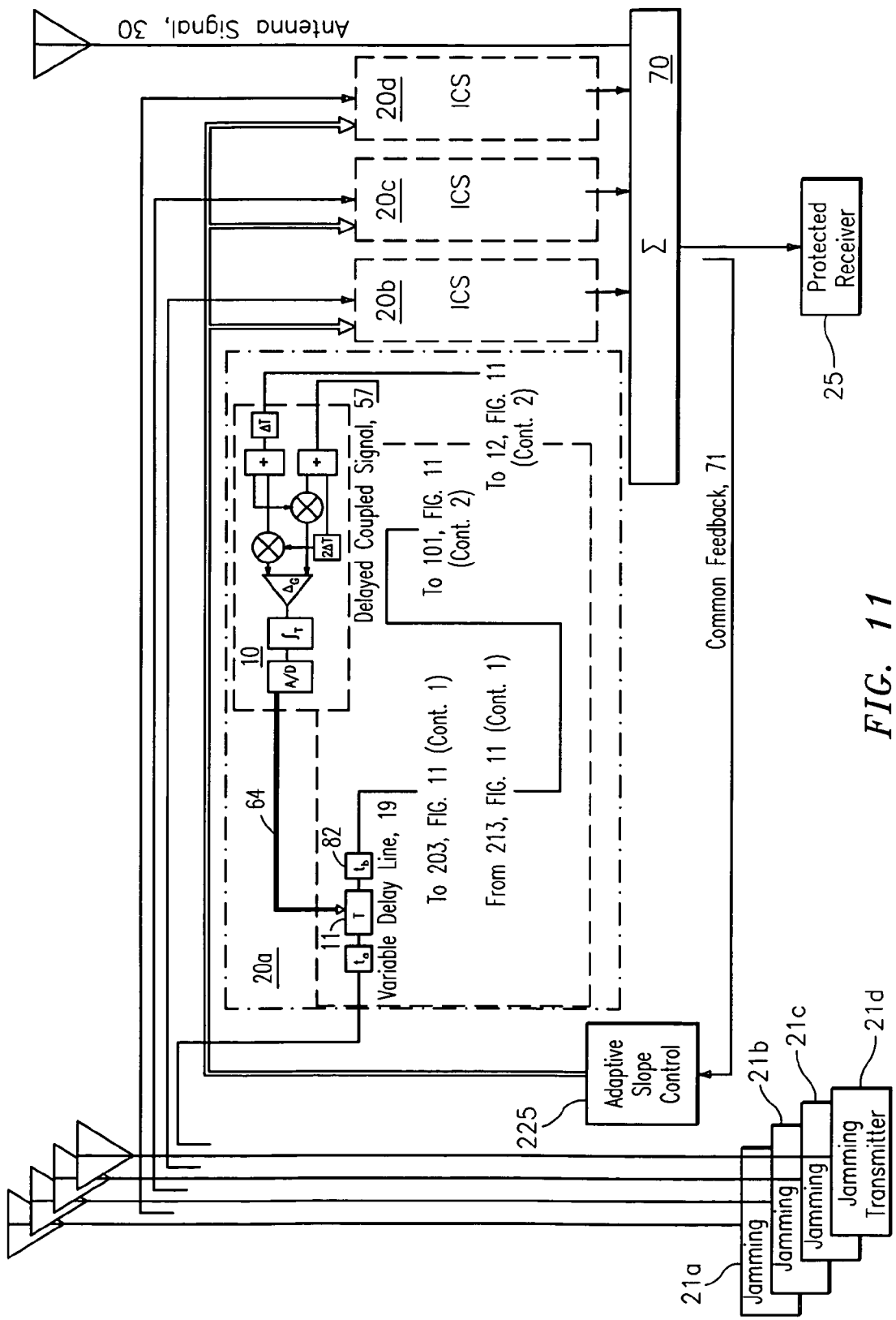
FIG. 11 illustrates one embodiment of an improved cosite interference cancellation system 20 for elimination of interfering signals between three or more co-located transceivers.

Referring now to FIG. 11 there is shown an improved cosite interference cancellation system 20 for elimination of interfering signals between a single co-located transceiver 21 and a plurality of receivers to be protected. In the presently described embodiment, it is desired to protect a multiplicity of receivers, 25a-25d, four of which are shown by way of example and not limitation. To protect the plurality of receivers 25a-25d, each receiver is coupled to a corresponding Adaptive control loops (ACL) 6a-6d operably coupled with associated independent Adaptively Tuned Slope Control (ATSC) module 200a-200d each comprises three main elements; a Variable Lobe Filter Structure (VLFS) 201, a Time Delay Tuning Control (TDTC) element 202, and a common adaptive slope control 225 of prior art.

As the receive path interference signal provided to the ICS is primarily disrupted by signal distortions in time of arrival, linear and quadratic amplitude, and linear and quadratic phase, the ICS is tasked with greater levels of correction for these distortions as greater nulling is required. The sampled transmission cancellation signal must be adjusted to match this distorted receive path signal as closely as possible to achieve complete nulling of the received interference signal but this becomes more difficult as communication bandwidths increase. The ideal solution would be to have independent building blocks that can take out each individual disruption of the signal but this is very difficult. For example, both the ASMF and the QAMF have additional throughput time delays that must be considered in time delay match and the ASMF used herein has additional quadratic amplitude distortion that has to be corrected in the match to the propagated path. The architecture presented herein allows the consecutive insertion of additional corrective building blocks such that their corrections are additive and their self perturbations to the coupled signal can be corrected through the common feedback after cancellation. Three of the primary signal distortions, i.e. time delay, linear amplitude, and quadratic amplitude, are corrected by the building blocks included at this point in the description. As circuits are developed for linear and quadratic phase distortions are developed, they can be inserted within this architecture.

Figure 12:
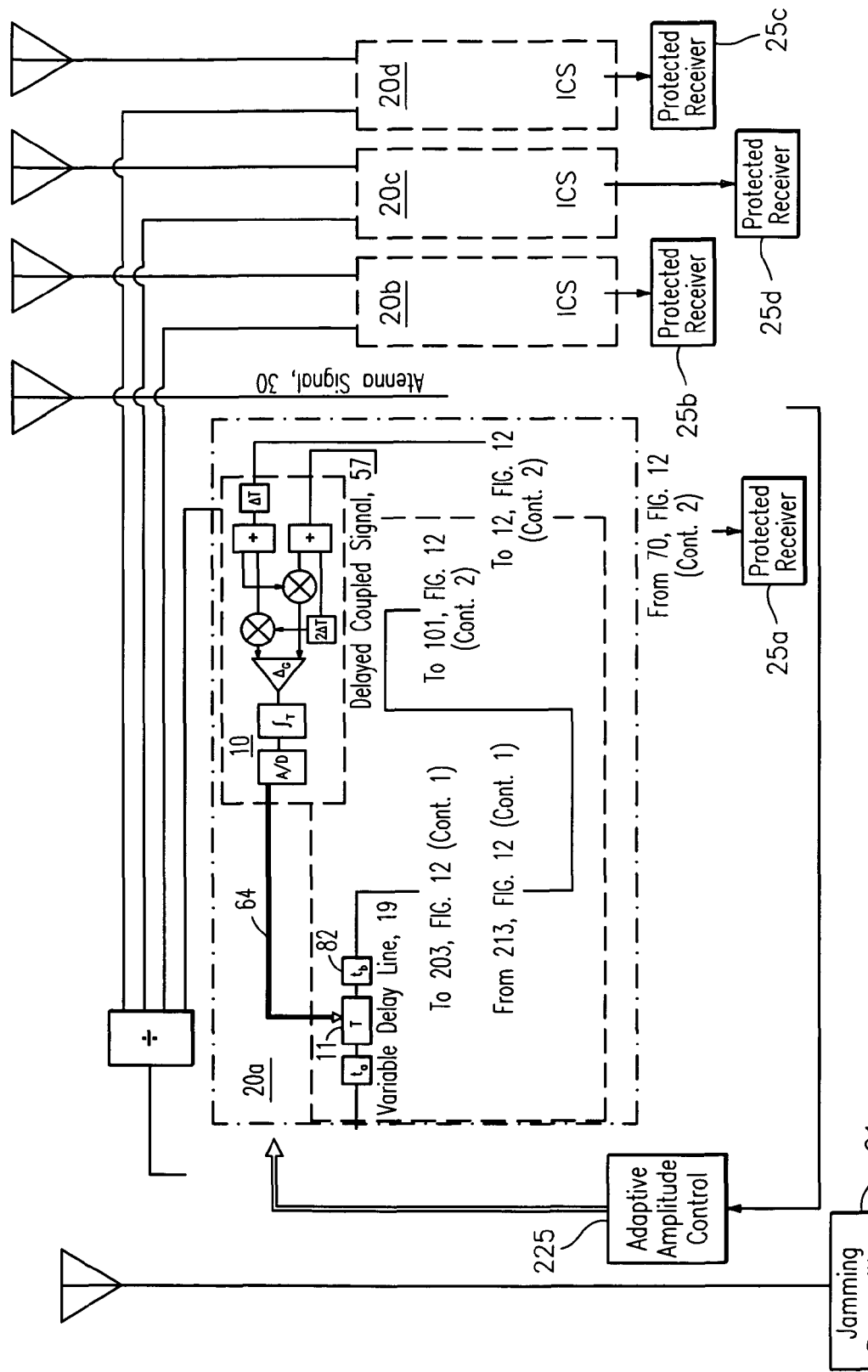
FIG. 12 illustrates an improved cosite interference cancellation system for elimination of interfering signals between a single co-located transceiver and a plurality of receivers to be protected.

Referring now to FIG. 12 there is shown an improved cosite interference cancellation system 20 for elimination of interfering signals between a single co-located transceiver 21 and a plurality of receivers to be protected. In the presently described embodiment, it is desired to protect a multiplicity of receivers, 25a-25d, four of which are shown by way of example and not limitation. To protect the plurality of receivers 25a-25d, each receiver is coupled to a corresponding Adaptive control loops (ACL) 6a-6d operably coupled with associated independent Adaptively Tuned Slope Control (ATSC) module 200a-200d each comprises three main elements; a Variable Lobe Filter Structure (VLFS) 201, a Time Delay Tuning Control (TDTC) element 202, and a common adaptive slope control 225 of prior art.

Although the parameter matching circuits may not be truly orthogonal in their actions and their impact upon the total system performance, they should all be monotonic in effect so that standard energy reduction algorithms will be effective for system convergence. These include gradient search, random search, and perturbational correlation using orthogonal Walsh functions as control algorithms.

In one embodiment a method and apparatus for reducing the effects of interference between collocated transceivers is disclosed. The method comprises the steps of, (a) matching a time delay of a first received signal in a controlled propagation path to a second received signal over an uncontrolled propagation path; (b) continuously and automatically frequency tuning a lobed amplitude slope matching filter (ASMF) applied to the first received signal to allow tracking of the first received signal to match a dynamically changing amplitude slope of the second signal; (c) continuously and automatically tuning a quadratic amplitude matching filter (QAMF) applied to the first received signal to allow tracking of the first received signal to match a dynamically changing quadratic amplitude distortion of the second received signal; (d) acquiring a first error measurement signal responsive to an adaptive control loop for adjusting a complex weighting of the delayed coupled first received signal with current match to maximally cancel the propagated second received signal, (e) acquiring a second error measurement signal responsive to step (a) of matching a time delay of the first received signal in a controlled propagation path to a second received signal over an uncontrolled propagation path; (f) acquiring a third error measurement signal responsive to step (b) of continuously and automatically tuning a lobed amplitude slope matching filter (ASMF) applied to the first received signal to allow tracking of the first received signal to match a dynamically changing amplitude slope of the second received signal; (g) acquiring a fourth error measurement signal responsive to step (c) of continuously and automatically tuning a quadratic amplitude matching filter (QAMF) applied to the first received signal to match a dynamically changing quadratic amplitude slope distortion of the second received signal; and (h) repeating steps a-g until the first, second, third and fourth error measurement signals are minimized. The method further comprises taking the first, third, and fourth error measurement signals taken from a common circuit point located at the output of the summing junction of the adaptive control loop. The second error measurement signal is formed from inputs of the summing junction of the adaptive control loop 4. It should be appreciated that other circuits with variable distortions of time delay, amplitude slope, and quadratic amplitude shapes can be included within the processing chain and their errors will be corrected by the adaptive processes of these circuits.

The step (a) of matching a time delay of a first received signal in a controlled propagation path to a second received signal over an uncontrolled propagation path further comprises: (a) sampling a first signal of known source; (b) delaying the first signal in a variable delay line under control of a delay control signal, a known and controlled propagation path; (c) sampling the first signal received over the controlled propagation path; (d) sampling the second signal received over the uncontrolled propagation path; (e) forming a delayed sample of the first received signal; (f) forming a delayed sample of the second received signal; (g) generating a first autocorrelation value from the first signal and the delayed second signal; (h) generating a second autocorrelation value from the delayed first signal and the delayed second signal; (i) computing a difference value between the first autocorrelation value and the second autocorrelation value; (j) decreasing a delay control signal to more closely match the time delay between the first received signal and the second received signal in the case where the difference value is negative and its absolute value is greater than a predetermined threshold; (k) increasing the delay control signal to more closely match the time delay between the first received signal and the second received signal in the case where the difference value is positive and its absolute value is greater than the threshold; and repeating steps (a)-(k).

Steps (a)-(k) are repeated only until the absolute value of the difference value is less than the predetermined threshold, thereby matching the time delay between the first received signal and the second received signal. The first and second signals are derived from said known source. Step (b) of continuously and automatically tuning a lobed amplitude slope matching filter (ASMF) to an inserted signal to allow tracking of the inserted signal to match a dynamically changing amplitude slope of the second received signal for improved interference cancellation system performance further comprises: a) forming a broadband RF lobed filter having a single quiescent null within a frequency band of interest; b) dynamically adjusting a delay time (T) for tuning the single quiescent null of the formed broadband RF lobed filter to effectively block an interfering signal to be tracked; c) forming a more narrowband RF lobed filter; d) skewing the narrowband RF lobed filter to implement a corrective amplitude slope of the inserted signal, thereby improving the performance in the improved interference cancellation system; and repeating steps (a)-(d).

The more narrowband RF lobed filter is formed dependent upon the tuning of the broadband RF lobed filter and is orthogonal to the broadband RF lobed filter in its quiescent state.

The step of skewing the narrowband RF filter lobe at said step (d) is performed under the control of an external amplitude slope control signal.

The narrowband RF lobed filter is comprised of a plurality of lobes within a single lobe of a filter with null-to-null bandwidth of the formed broadband RF filter but orthogonal to it. One of the plurality of lobes is peaked on the interfering signal to be tracked and is a quiescent lobe of an amplitude sloped matching filter (ASMF) function and is centered at a null of the broadband RF lobed filter.

The step of dynamically adjusting a delay time (T) for tuning the single quiescent null of the formed broadband RF lobed filter further comprises skewing the broadband RF filter quiescent null in a direction to effectively reject the inserted signal to be tracked.

The step (c) of continuously and automatically tuning a quadratic amplitude matching filter (QAMF) to an first received signal to allow tracking of the first received signal to match a dynamically changing quadratic amplitude distortion of the second received signal for improved interference cancellation system performance further comprises: a) forming an imaginary broadband RF lobed filter having a single quiescent null within a frequency band of interest; b) dynamically adjusting a delay time (T) for tuning the single quiescent null of the imaginary broadband RF lobed filter to effectively block the inserted signal to be tracked; c) forming a first narrowband RF lobed filter with a quiescent lobe peak centered on a quiescent null of the inserted signal to be tracked, wherein an output of the first narrowband RF lobed filter output has a near-linear and flat amplitude shape to match a dynamically changing quadratic amplitude distortion of the inserted signal to be tracked; d) forming a second narrowband RF lobed filter with a quiescent lobe peak centered on the quiescent null of the inserted signal to be tracked, wherein an output of the second narrowband RF lobed filter has a downward quadratic amplitude shape to match a dynamically changing quadratic amplitude distortion of the inserted signal to be tracked; e) forming an FIR filter with a quiescent lobe peak centered on the quiescent null of the inserted signal to be tracked, wherein an output of the FIR filter has an upward quadratic amplitude shape to match dynamically changing quadratic amplitude distortion of the inserted signal to be tracked; f) adjusting an in-line path delay of the first narrowband RF lobed filter, the second narrowband RF lobed filter and the FIR filter to have the same throughput delay; and g) adjusting combining weights of the respective filter outputs of the first narrowband RF lobed filter, the second narrowband RF lobed filter and the FIR filter to implement a corrective quadratic amplitude shaping of the inserted signal, thereby matching a dynamically changing quadratic amplitude distortion of the inserted signal to be tracked.

The respective outputs of the first and second narrowband RF lobed filters and the FIR filter are dependent upon the dynamically adjusted delay time (T) for tuning the single quiescent null of the imaginary broadband RF lobed filter.

The first and second narrowband RF lobed filters and the FIR filter are orthogonal to the imaginary broadband RF lobed filter in a quiescent state.

The step (g) of adjusting combining weights of respective filter outputs of the first narrowband RF lobed filter, the second narrowband RF lobed filter and the FIR filter parallel filters is performed under control of an external amplitude control signal.

The first and second narrowband RF lobed filters and the FIR filter are comprised of a plurality of lobes formed within the frequency span of a single lobe of the imaginary broadband RF lobed tuning filter.

One of the plurality of lobes of the narrowband RF lobed filter is peaked on the inserted signal to be tracked and is a quiescent lobe of an amplitude sloped matching filter (ASMF) function and is centered at a null of the broadband RF lobed filter.

One of the plurality of lobes of the imaginary broadband RF lobed tuning filter, peaked on the inserted signal to be tracked, has an amplitude shape to correct a dynamically changing quadratic amplitude distortion of the inserted signal to be tracked.

In one embodiment a method and apparatus for reducing the effects of interference between collocated transceivers is disclosed. The method comprises the steps of: matching a time delay of a first received signal in a controlled propagation path to a second received signal over an uncontrolled propagation path; continuously and automatically frequency tuning a lobed amplitude slope matching filter (ASMF) to the first received signal to allow tracking of the first received signal to match a dynamically changing amplitude slope of the second received signal using an offline process; continuously and automatically tuning a quadratic amplitude matching filter (QAMF) to the first received signal, to allow tracking of the first received signal to match a dynamically changing quadratic amplitude distortion of the second received signal; acquiring a first error measurement signal responsive to an adaptive control loop for adjusting a complex weighting of the delayed coupled signal with current match to maximally cancel the propagated received signal, acquiring a second error measurement signal responsive to the step (a) of matching a time delay of a first received signal in a controlled propagation path to a second received signal over an uncontrolled propagation path; (a) acquiring a third error measurement signal responsive to the step (b) of continuously and automatically tuning a lobed amplitude slope matching filter (ASMF) to the first received signal to allow tracking of the second received signal to match a dynamically changing amplitude slope of the inserted signal; acquiring a fourth error measurement signal responsive to the step (c) of continuously and automatically tuning a quadratic amplitude matching filter (QAMF) to the first received signal signal to match a dynamically changing quadratic amplitude slope distortion of the second received signal; and repeating steps (a-g) until the first, second, third and fourth error measurement signals are minimized.

The first, third, and fourth error measurement signals are taken from a common circuit point located at the output of the summing junction of the adaptive control loop.

The second error measurement signal is formed from inputs of the summing junction of the adaptive control loop.

The step (a) of matching a time delay of a first received signal in a controlled propagation path to a second received signal over an uncontrolled propagation path further comprises: (a) sampling a first signal of known source; (b) delaying the first signal in a variable delay line under control of a delay control signal, a known and controlled propagation path; (c) sampling the first signal received over the controlled propagation path; (d) sampling the second signal received over the uncontrolled propagation path; (e) forming a delayed sample of the first received signal; (f) forming a delayed sample of the second received signal; (g) generating a first autocorrelation value from the first signal and the delayed second signal; (h) generating a second autocorrelation value from the delayed first signal and the delayed second signal; (i) computing a difference value between the first autocorrelation value and the second autocorrelation value; (j) decreasing a delay control signal to more closely match the time delay between the first received signal and the second received signal in the case where the difference value is negative and its absolute value is greater than a predetermined threshold; (k) increasing the delay control signal to more closely match the time delay between the first received signal and the second received signal in the case where the difference value is positive and its absolute value is greater than the threshold; and (l) repeating steps (a)-(k).

In one embodiment, steps (a)-(k) are repeated only until the absolute value of the difference value is less than the predetermined threshold, thereby matching the time delay between the first received signal and the second received signal.

In an embodiment, the second signal and the first signal are derived from a single source and steps (c)-(l) are performed offline. The delay of the delayed sample in step (f) of the second sampled signal is substantially twice the delay of the first sampled signal in step (e).

Step (b) of continuously and automatically tuning a lobed amplitude slope matching filter (ASMF) to the first received signal to allow frequency tracking of the first received signal to match a dynamically changing amplitude slope of the second received signal using an offline process comprises: a) forming a first broadband RF lobed filter having a quiescent null proximate to and offset above a center frequency of an imaginary broadband RF lobed tuning filter; b) forming a second broadband RF lobed filter having a quiescent null proximate to and offset below the center frequency of the imaginary broadband RF lobed tuning filter; c) detecting a level of RF energy output from the first broadband RF lobed filter as a first broadband RF lobed filter output; d) detecting a level of RF energy output from the second broadband RF lobed filter as a second broadband RF lobed filter output; calculating an error signal by subtracting the first broadband RF lobed filter output value from the second broadband RF lobed filter output value; f) integrating the error signal to generate a control voltage; g) dynamically adjusting the delay time T, via the generated control voltage, to control a lobe bandwidth of the first and second broadband RF lobed filters, an imaginary nulling RF lobed filter and the imaginary broadband RF lobed tuning filter; h) forming a more narrowband RF lobed filter orthogonal to the imaginary broadband RF lobed nulling filter in its quiescent state, i) skewing the narrowband RF filter lobe to implement a corrective amplitude slope of the inserted signal, thereby improving the performance in the improved interference cancellation system; and (j) repeating steps (a)-(i).

In an embodiment, the first broadband RF lobed filter is formed from a second signal path having a delay of T−ΔT relative to a first signal path forming the imaginary broadband RF lobed tuning filter having a delay T. The second broadband RF lobed filter is formed from a third signal path having a delay of T+ΔT relative to a first signal path forming the imaginary broadband RF lobed tuning filter having a delay T.

Quiescent nulls of the first and second RF lobed filters bracket a quiescent null of an imaginary lobed nulling filter that is orthogonal to the imaginary RF lobed tuning filter.

Step (g) of dynamically adjusting the delay time T via the generated control voltage indirectly controls the frequency of the first and second broadband RF lobed filter quiescent nulls to effectively bracket the inserted signal to be tracked.

The value of ΔT is selected to provide sufficient offset of first and second broadband RF lobed filter quiescent nulls such that they are separated by the expected bandwidth of the inserted signal to be tracked.

The method according to the present exemplary embodiment, further comprises forming the more narrowband RF lobed filter dependent upon the tuning of the broadband RF lobed filters.

The more narrowband RF lobed filter is orthogonal to the imaginary broadband RF lobed nulling filter in its quiescent state.

In accordance with the described method, the step of skewing the narrowband RF filter lobe at step (i) is performed under the control of an external amplitude slope control signal.

The narrowband RF lobed filter is comprised of a plurality of lobes within a single lobe of the imaginary broadband RF tuning filter and wherein one of said plurality of lobes is peaked on the interfering signal to be tracked.

One of the plurality of lobes peaked on the inserted signal to be tracked is a quiescent lobe of an amplitude sloped matching filter (ASMF) function. One of the plurality of lobes peaked on the interfering signal to be tracked is centered at a null of the imaginary broadband RF lobed nulling filter.

Step (g) of dynamically adjusting a delay time (T) for tuning the quiescent nulls of the formed first and second broadband RF lobed filters further comprises skewing the first and second broadband RF lobed filter quiescent nulls in a direction to effectively evenly match energy of the tracked interfering signal passing through the two filters.

Step (c) of continuously and automatically frequency tuning a quadratic amplitude matching filter (QAMF) to the first received signal to allow tracking of the first received signal to match a dynamically changing quadratic amplitude distortion of the second received signal for improved interference cancellation system performance further comprises: a) forming an imaginary broadband RF lobed filter having a single quiescent null within a frequency band of interest; b) dynamically adjusting a delay time (T) for tuning the single quiescent null of the imaginary broadband RF lobed filter to effectively block the inserted signal to be tracked; c) forming a first narrowband RF lobed filter with a quiescent lobe peak centered on a quiescent null of the inserted signal to be tracked, wherein an output of the first narrowband RF lobed filter output has a near-linear and flat amplitude shape to match a dynamically changing quadratic amplitude distortion of the inserted signal to be tracked; d) forming a second narrowband RF lobed filter with a quiescent lobe peak centered on the quiescent null of the inserted signal to be tracked, wherein an output of the second narrowband RF lobed filter has a downward quadratic amplitude shape to match a dynamically changing quadratic amplitude distortion of the inserted signal to be tracked; e) forming an FIR filter with a quiescent lobe peak centered on the quiescent null of the inserted signal to be tracked, wherein an output of the FIR filter has an upward quadratic amplitude shape to match a dynamically changing quadratic amplitude distortion of the inserted signal to be tracked; f) adjusting an in-line path delay of the first narrowband RF lobed filter, the second narrowband RF lobed filter and the FIR filter to have the same throughput delay; and g) adjusting combining weights of the respective filter outputs of the first narrowband RF lobed filter, the second narrowband RF lobed filter and the FIR filter to implement a corrective quadratic amplitude shaping of the inserted signal, thereby matching a dynamically changing quadratic amplitude distortion of the inserted signal to be tracked.

The respective outputs of the first and second narrowband RF lobed filters and the FIR filter are dependent upon the dynamically adjusted delay time (T) for tuning the single quiescent null of the imaginary broadband RF lobed filter.

The first and second narrowband RF lobed filters and the FIR filter are orthogonal to the imaginary broadband RF lobed filter in a quiescent state.

Step (g) of adjusting combining weights of respective filter outputs of the first narrowband RF lobed filter, the second narrowband RF lobed filter and the FIR filter parallel filters is performed under control of an external amplitude control signal.

The first and second narrowband RF lobed filters and the FIR filter are comprised of a plurality of lobes formed within the frequency span of a single lobe of the imaginary broadband RF lobed tuning filter.

One of the plurality of lobes of the narrowband RF lobed filter is peaked on the inserted signal to be tracked and is a quiescent lobe of an amplitude sloped matching filter (ASMF) function and is centered at a null of the broadband RF lobed filter.

One of the plurality of lobes of the imaginary broadband RF lobed tuning filter, peaked on the inserted signal to be tracked, has an amplitude shape to correct a dynamically changing quadratic amplitude distortion of the inserted signal to be tracked.

The foregoing is construed as only being an illustrative embodiment of this invention. Persons skilled in the art can easily conceive of alternative arrangements providing a functionality similar to this embodiment without any deviation from the fundamental principles or the scope of the invention.

What is claimed is:

1. A method and apparatus for reducing the effects of interference between collocated transceivers, the method comprising:
   a) matching a time delay of a first received signal in a controlled propagation path to a second received signal over an uncontrolled propagation path;
   b) continuously and automatically frequency tuning a lobed amplitude slope matching filter (ASMF) applied to the first received signal to allow tracking of the first received signal to match a dynamically changing amplitude slope of the second received signal;
   c) continuously and automatically tuning a quadratic amplitude matching filter (QAMF) applied to the first received signal to allow tracking of the first received signal to match a dynamically changing quadratic amplitude distortion of the second received signal;
   d) acquiring a first error measurement signal responsive to an adaptive control loop for adjusting a complex weighting of the delayed coupled first received signal with current match to maximally cancel the propagated second received signal;
   e) acquiring a second error measurement signal responsive to said step (a) of matching a time delay of the first received signal in a controlled propagation path to the second received signal over an uncontrolled propagation path;
   f) acquiring a third error measurement signal responsive to said step (b) of continuously and automatically tuning a lobed amplitude slope matching filter (ASMF) applied to the first received signal to allow tracking of the first received signal to match a dynamically changing amplitude slope of the second received signal;
   g) acquiring a fourth error measurement signal responsive to said step (c) of continuously and automatically tuning a quadratic amplitude matching filter (QAMF) applied to the first received signal to match a dynamically changing quadratic amplitude slope distortion of the second received signal; and
   h) repeating steps a-g until the first, second, third and fourth error measurement signals are minimized.

2. The method according to claim 1, wherein said first, third, and fourth error measurement signals are taken from a common circuit point located at the output of the summing junction of the adaptive control loop.

3. The method according to claim 1, wherein said second error measurement signal is formed from inputs of the summing junction of the adaptive control loop.

4. A method and apparatus for reducing the effects of interference between collocated transceivers, the method comprising:
   a) matching a time delay of a first received signal in a controlled propagation path to a second received signal over an uncontrolled propagation path;
   b) continuously and automatically frequency tuning a lobed amplitude slope matching filter (ASMF) to the first received signal to allow tracking of the first received signal to match a dynamically changing amplitude slope of the second received signal using an offline process;
   c) continuously and automatically tuning a quadratic amplitude matching filter (QAMF) to the first received signal, to allow tracking of the first received signal to match a dynamically changing quadratic amplitude distortion of the second received signal;
   d) acquiring a first error measurement signal responsive to an adaptive control loop for adjusting a complex weighting of the delayed coupled signal with current match to maximally cancel the propagated received signal;
   e) acquiring a second error measurement signal responsive to said step (a) of matching a time delay of the first received signal in a controlled propagation path to the second received signal over an uncontrolled propagation path;
   f) acquiring a third error measurement signal responsive to said step (b) of continuously and automatically tuning a lobed amplitude slope matching filter (ASMF) to the first received signal to allow tracking of the second received signal to match a dynamically changing amplitude slope of the inserted signal;
   g) acquiring a fourth error measurement signal responsive to said step (c) of continuously and automatically tuning a quadratic amplitude matching filter (QAMF) to the first received signal to match a dynamically changing quadratic amplitude slope distortion of the second received signal; and
   h) repeating steps (a-g) until the first, second, third and fourth error measurement signals are minimized.

5. The method according to claim 4, wherein said first, third, and fourth error measurement signals are taken from a common circuit point located at the output of the summing junction of the adaptive control loop.

6. The method according to claim 4, wherein said second error measurement signal is formed from inputs of the summing junction of the adaptive control loop.

7. An interference cancellation system, comprising:
   (A) a variable delay line (19) for adjusting a signal propagation time of a sampled transmission signal (40), the variable delay line (19) comprising:
      (i) a single or multiple fixed delay elements (80, 82) in series with the propagated received signal path;
      (ii) a variable delay element (11) for continuously varying a delay of sampled transmission signal (40) to implement a match between a sampled transmission signal (40) and a propagated received signal (30) yielding a delayed coupled signal (57);
   (B) an adaptive time delay control (ATDC) module (10) for calculating a delay to be added to a first propagation path to achieve a match of the first signal passing through a controlled propagation path with a second signal passing through an uncontrolled propagation path; and
   (C) an adaptively tuned sloped control (ATSC) module (200) for providing a tuning procedure directed to an ASMF control function to the band of interference and for externally controlling the ASMF control function subsequent to said tuning, said adaptively tuned sloped control (ATSC) module 200 comprising:
      (i) an inline variable lobe filter structure (VLFS) (201) for providing controlled variable time delay for generating a broadband RF tuning filter formed by a delay T and a slope control filter lobe formed by a first delay and a second delay (2nT) (208) yield a total time delay of (2n+1)T centered in the null of the tuning filter and skewed by an external slope control signal;
      (ii) an offline time delay tuning control (TDTC) element (202) for receiving signal samples output from the inline variable lobe filter structure (VLFS) 201 to control a first variable time delay element (T) 205 of the inline variable lobe filter structure (VLFS) 201 to provide said controlled variable time delay to generate said broadband RF tuning filter and a second variable time delay element (2nT) 208 of the inline variable lobe filter structure (VLFS) 201 to provide said controlled variable time delay to generate said slope control filter lobe; and
   (D) an adaptively tuned quadratic control (ATQC) module (200) for providing a tuning procedure directed to a quadratic amplitude matching filter (QAMF) (100) control function to the band of interference and for externally controlling the QAMF control function subsequent to said tuning, said adaptively tuned quadratic control (ATQC) module (200) comprising:
      (i) an inline variable lobe filter structure (VLFS) (201) for providing controlled variable time delay for generating a broadband RF tuning filter formed by a delay T and a first narrowband inline control filter for providing a near-flat quadratic control filter lobe formed by a first delay (T) and a second delay (2nT) yielding a total time delay of (2n+1)T centered in the null of the broadband RF tuning filter and weighted by an external amplitude control signal;
      (ii) a second narrowband inline control filter as a slaved lobe filter structure-down (104) for providing a down quadratic amplitude control filter lobe formed by a delay of (2m+1)T centered in the null of the RF tuning filter and weighted by an external amplitude control signal;
      (iii) a third narrowband inline control filter as a slaved lobe filter structure-up (105) for providing a up quadratic amplitude control filter lobe formed by a simple FIR filter with inter-tap spacing delay of (2o+1)T centered in the null of the tuning filter and weighted by an external amplitude control signal;
   (E) an adaptive control loop (6) for adjusting a complex weighting of the delayed coupled signal (57) to maximally cancel the propagated received signal (30).

8. The interference cancellation system of claim 7 wherein the adaptive time delay control (ATDC) module (10) comprises:
   a reference port (13) for receiving a signal sample (30) of a signal (7) transmitted from the transmission antenna (2) and received at the local receive antenna (4) via the directly coupled reference path (3);
   a first delay (24) for delaying the signal sample (30) to make it late compared to the delayed transmission signal (55);
   a first splitter (23) for splitting the delayed signal sample (28) into a first delayed reference signal sample (29a) and a second delayed reference signal sample (29b), a second splitter (31) for splitting a delayed transmission signal (55) into a first delayed transmission signal sample (14) and a second delayed transmission signal sample (15);

a second delay (22) for delaying the second delayed transmission signal sample (15); to make it late compared to the delayed reference signal samples (29a and 29b)

a first ATDC mixer (26) for mixing the first delayed signal sample (29a) and the first delayed transmission signal sample (14) to output a first autocorrelation sample (60);

a second ATDC mixer for (27) for mixing the second delayed signal sample (29b) and the first delayed transmission signal sample (15) to output a second autocorrelation sample (61);

a differencing amplifier (16) for computing the difference of the first and second autocorrelation signal samples to yield an error signal;

an integrator (17) for integrating the error signal yielding an integrated error signal; and an A/D converter (18) for converting the integrated error signal (62) to a digital integrated error signal 64 to control the variable delay line (19).

9. The interference cancellation system of claim 7, wherein the inline variable lobe filter structure (VLFS) (201) comprises:
a) said first variable time delay line (T) (205) for providing broadband tuning of an imaginary tuning filter lobe; and
b) a second variable time delay line (2nT) (208), added to first variable time delay element (205), for providing more narrowband tuning of the imaginary tuning filter lobe relative to said first delay element; wherein said narrowband tuning filter is skewed by an external slope control signal.

10. The interference cancellation system of claim 9, wherein the second variable time delay line (2nT) 208 is an integer multiple of said first time delay line (T) (205).

11. The interference cancellation system of claim 7, wherein the inline variable lobe filter structure (VLFS) 201 comprises:
a) said first variable time delay line (T) (205) for providing broadband tuning of an imaginary tuning filter lobe; and
b) a second variable time delay line (2nT) (208) for providing more narrowband tuning of the imaginary tuning filter lobe relative to said first delay element; wherein said first variable time delay element (205) and second variable time delay element (2nT) (208) yield a total time delay of (2n+1)T centered in the null of the tuning filter and skewed by an external slope control signal.

12. The interference cancellation system of claim 7, wherein the adaptive control loop (6) comprises:
a reference port (9) for receiving the antenna signal (30);
an auxiliary port (8) for receiving a delayed and matched coupled signal (57);
a complex correlator (66) for generating error correlation signal (72);
an integrator (67) to smooth transients on the error correlation signal (72) to form the adaptive weight control signals (73);
a complex phase and amplitude weighting device (68) having a first input and a second input, said first input receiving said delayed and matched coupled signal (57), said second input receiving a complex adaptive weight control signal (73) to weight the delayed and matched coupled signal (57) to produce a weighted delayed coupled signal (65); and forming a weighted delayed coupled signal (65) as a mirror image of a propagated reference signal, contained in antenna signal 30;

a summing junction (70) having a first and second input, said first input for receiving said weighted delayed coupled signal (65) output from said complex phase and amplitude weighting device (68), said second input for receiving the received reference signal (71) to yield a protected output signal (58).

13. The interference cancellation system of claim 7 wherein said propagated reference signal (30) comprises at least a transmission signal (40) propagated from a first antenna (2) and received at a second antenna (4), wherein said antenna signal (30) is propagated through an uncontrolled path between said first (2) and second (4) antennas.

14. The interference cancellation system of claim 12, wherein forming the weighted delayed coupled signal (65) as a mirror image of the propagated reference signal indicates that it is equal in amplitude and 180° out of phase with a received portion of the transmitted signal (40) in the received reference signal (71).

15. The interference cancellation system of claim 9, wherein said antenna signal (30) includes the propagated reference signal and at least one other signal.

16. The interference cancellation system of claim 15, wherein the at least one other signal is a desired signal anticipated by receiver (25).

17. The interference cancellation system of claim 7, wherein other circuits with variable distortions of time delay, amplitude slope, and quadratic amplitude shapes can be included within the processing chain and their errors will be corrected by the adaptive processes of these circuits.

18. An interference cancellation system, comprising:
(A) a variable delay line (19) for adjusting a signal propagation time of a sampled transmission signal (40), the variable delay line (19) comprising:
(i) a single or multiple fixed delay elements (80, 82) in series with the propagated received signal path;
(ii) a variable delay element (11) for continuously varying a delay of sampled transmission signal (40) to implement a match between a sampled transmission signal (40) and a propagated received signal (30) yielding a delayed coupled signal (57);
(B) an adaptive time delay control (ATDC) module (10) for calculating a delay to be added to a first propagation path to achieve a match of the first signal passing through a controlled propagation path with a second signal passing through an uncontrolled propagation path; and
(C) an adaptively tuned sloped control (ATSC) module 200 for providing a tuning procedure directed to an ASMF control function to the band of interference and for externally controlling the ASMF control function subsequent to said tuning, said adaptively tuned sloped control (ATSC) module (200) comprising:
(i) an inline variable lobe filter structure (VLFS) 201 for providing controlled variable time delay for generating; (1) a first broadband RF lobed filter formed by a delay T−ΔT, a second broadband RF lobed filter formed by a delay T+ΔT, and (3) a slope control filter lobe formed by a first delay T (205) and a second delay (2nT) (208) yield a total time delay of (2n+1)T centered in the null of the imaginary broadband RF lobed nulling filter and skewed by an external slope control signal;
(ii) an offline time delay tuning control (TDTC) element (202) for receiving signal samples output from the inline variable lobe filter structure (VLFS) (201) to control in a consistent trend a first variable time delay element (T) (205) of the inline variable lobe filter structure (VLFS) 201 to provide said controlled variable time delay to generate said broadband RF tuning filter and a second variable time delay element (2nT) (208) of the inline variable lobe filter structure (VLFS) 201 to provide said controlled variable time delay to generate said slope control filter lobe;

(D) an adaptively tuned quadratic control (ATQC) module (200) for providing a tuning procedure directed to a quadratic amplitude matching filter (QAMF) (100) control function to the band of interference and for externally controlling the QAMF control function subsequent to said tuning, said adaptively tuned quadratic control (ATQC) module (200) comprising:

(i) an inline variable lobe filter structure (VLFS) (201) for providing controlled variable time delay for generating a broadband RF tuning filter formed by a delay T and a first narrowband inline control filter for providing a near-flat quadratic control filter lobe formed by a first delay (T) and a second delay (2nT) yielding a total time delay of (2n+1)T centered in the null of the broadband RF tuning filter and weighted by an external amplitude control signal;

(ii) a second narrowband inline control filter as a slaved lobe filter structure-down (104) for providing a down quadratic amplitude control filter lobe formed by a delay of (2m+1)T centered in the null of the RF tuning filter and weighted by an external amplitude control signal;

(iii) a third narrowband inline control filter as a slaved lobe filter structure-up (105) for providing a up quadratic amplitude control filter lobe formed by a simple FIR filter with inter-tap spacing delay of (2o+1)T centered in the null of the tuning filter and weighted by an external amplitude control signal;

(E) an adaptive control loop (6) for adjusting a complex weighting of the delayed coupled signal (57) to maximally cancel the propagated received signal (30).

19. The interference cancellation system of claim 18 wherein the adaptive time delay control (ATDC) module (10) comprises:
a reference port (13) for receiving a signal sample (30) of a signal (7) transmitted from the transmission antenna (2) and received at the local receive antenna (4) via the directly coupled reference path (3);
a first delay (24) for delaying the signal sample (30) to make it late compared to the delayed transmission signal (55);
a first splitter (23) for splitting the delayed signal sample (28) into a first delayed reference signal sample (29a) and a second delayed reference signal sample (29b),
a second splitter (31) for splitting a delayed transmission signal (55) into a first delayed transmission signal sample (14) and a second delayed transmission signal sample (15);
a second delay (22) for delaying the second delayed transmission signal sample (15); to make it late compared to the delayed reference signal samples (29a and 29b)
a first ATDC mixer (26) for mixing the first delayed signal sample (29a) and the first delayed transmission signal sample (14) to output a first autocorrelation sample (60);
a second ATDC mixer for (27) for mixing the second delayed signal sample (29b) and the first delayed transmission signal sample (15) to output a second autocorrelation sample (61);
a differencing amplifier (16) for computing the difference of the first and second autocorrelation signal samples to yield an error signal;
an integrator (17) for integrating the error signal yielding an integrated error signal; and
an A/D converter (18) for converting the integrated error signal (62) to a digital integrated error signal 64 to control the variable delay line (19).

20. The interference cancellation system of claim 18, wherein the inline variable lobe filter structure (VLFS) 201 comprises:
a) said first variable time delay line (T) 205 for providing broadband tuning of an imaginary tuning filter lobe; and
b) a second variable time delay line (2nT) (208), added to first variable time delay element (205), for providing more narrowband tuning of the imaginary tuning filter lobe relative to said first delay element;
wherein said narrowband tuning filter is skewed by an external slope control signal.

21. The interference cancellation system of claim 18, wherein the second variable time delay line (2nT) (208) is an integer multiple of said first time delay line (T) 205.

22. The interference cancellation system of claim 18, wherein the inline variable lobe filter structure (VLFS) 201 comprises:
a) said first variable time delay line (T) (205) for providing broadband tuning of an imaginary tuning filter lobe; and
b) a second variable time delay line (2nT) (208) for providing more narrowband tuning of the imaginary tuning filter lobe relative to said first delay element;
wherein said first variable time delay element (205) and second variable time delay element (2nT) (208) yield a total time delay of (2n+1)T centered in the null of the tuning filter and skewed by an external slope control signal.

23. The interference cancellation system of claim 18, wherein the second variable time delay line (2nT) (208) is an integer multiple of said first time delay line (T) (205).

24. The interference cancellation system of claim 18, wherein the adaptive control loop (6) comprises:
a reference port (9) for receiving the antenna signal (30);
an auxiliary port (8) for receiving a delayed and matched coupled signal (57);
a complex correlator (66) for generating error correlation signal (72)
an integrator (67) to smooth transients on the error correlation signal (72) to form the adaptive weight control signals (73);
a complex phase and amplitude weighting device (68) having a first input and a second input, said first input receiving said delayed and matched coupled signal (57), said second input receiving a complex adaptive weight control signal (73) to weight the delayed and matched coupled signal (57) to produce a weighted delayed coupled signal (65); and forming a weighted delayed coupled signal (65) as a mirror image of a propagated reference signal, contained in antenna signal 30;
a summing junction (70) having a first and second input, said first input for receiving said weighted delayed coupled signal (65) output from said complex phase and amplitude weighting device (68), said second input for receiving the received reference signal (71) to yield a protected output signal (58).

25. The interference cancellation system of claim 18 wherein said propagated reference signal (30) comprises at least a transmission signal (40) propagated from a first antenna (2) and received at a second antenna (4), wherein said antenna signal (30) is propagated through an uncontrolled path between said first (2) and second (4) antennas.

26. The interference cancellation system of claim 24, wherein forming the weighted delayed coupled signal (65) as a mirror image of the propagated reference signal indicates that it is equal in amplitude and 180° out of phase with a received portion of the transmitted signal (40) in the received reference signal (71).

27. The interference cancellation system of claim 18, wherein said antenna signal (30) includes the propagated reference signal and at least one other signal.

28. The interference cancellation system of claim 27, wherein the at least one other signal is a desired signal anticipated by receiver (25).

29. The interference cancellation system of claim 18, wherein other circuits with variable distortions of time delay, amplitude slope, and quadratic amplitude shapes can be included within the processing chain and their errors will be corrected by the adaptive processes of these circuits.

* * * * *